United States Patent
Maeda et al.

(10) Patent No.: US 10,174,453 B2
(45) Date of Patent: Jan. 8, 2019

(54) SIZING AGENT, COMPOSITION, AND FORMED ARTICLE

(71) Applicant: JSR CORPORATION, Minato-ku (JP)

(72) Inventors: Shuugo Maeda, Minato-ku (JP); Akihiko Morikawa, Minato-ku (JP); Kentarou Kanae, Minato-ku (JP); Teruo Aoyama, Minato-ku (JP); Jirou Ueda, Minato-ku (JP); Masahiro Shibata, Minato-ku (JP); Akihiko Ookubo, Minato-ku (JP)

(73) Assignee: JSR CORPORATION, Minato-ku (JP)

( * ) Notice: Subject to any disclaimer, the term of this patent is extended or adjusted under 35 U.S.C. 154(b) by 0 days.

(21) Appl. No.: 15/326,342

(22) PCT Filed: Jul. 3, 2015

(86) PCT No.: PCT/JP2015/069300
§ 371 (c)(1),
(2) Date: Jan. 13, 2017

(87) PCT Pub. No.: WO2016/009858
PCT Pub. Date: Jan. 21, 2016

(65) Prior Publication Data
US 2017/0211225 A1  Jul. 27, 2017

(30) Foreign Application Priority Data

Jul. 16, 2014 (JP) ................................. 2014-146002
Sep. 30, 2014 (JP) ................................. 2014-200251

(51) Int. Cl.
| | |
|---|---|
| *D06M 15/693* | (2006.01) |
| *C08L 53/00* | (2006.01) |
| *C08L 101/00* | (2006.01) |
| *C08F 136/06* | (2006.01) |
| *C08C 19/22* | (2006.01) |
| *C08C 19/25* | (2006.01) |
| *C08C 19/44* | (2006.01) |
| *C08F 236/10* | (2006.01) |
| *C08F 8/42* | (2006.01) |
| *C08L 23/06* | (2006.01) |
| *C08L 23/12* | (2006.01) |
| *C08L 77/00* | (2006.01) |
| *D06M 101/06* | (2006.01) |
| *D06M 101/40* | (2006.01) |

(52) U.S. Cl.
CPC ........... *D06M 15/693* (2013.01); *C08C 19/22* (2013.01); *C08C 19/25* (2013.01); *C08C 19/44* (2013.01); *C08F 8/42* (2013.01); *C08F 136/06* (2013.01); *C08F 236/10* (2013.01); *C08L 23/06* (2013.01); *C08L 23/12* (2013.01); *C08L 53/00* (2013.01); *C08L 77/00* (2013.01); *C08L 101/00* (2013.01); *D06M 2101/06* (2013.01); *D06M 2101/40* (2013.01); *D06M 2200/40* (2013.01)

(58) Field of Classification Search
CPC .. D06M 15/693; D06M 2101/40; C08L 53/00
USPC ......................................................... 524/35
See application file for complete search history.

(56) References Cited

U.S. PATENT DOCUMENTS

| | | | |
|---|---|---|---|
| 3,398,045 A | 8/1968 | Clayton et al. | |
| 3,650,810 A | 3/1972 | Marzocchi | |
| 5,844,035 A * | 12/1998 | Ogawa ........................ | C08J 5/10 |
| | | | 524/494 |
| 2001/0004491 A1 | 6/2001 | Manabe et al. | |
| 2002/0048671 A1 | 4/2002 | Manabe et al. | |
| 2003/0100683 A1 | 5/2003 | Toyoizumi et al. | |
| 2012/0028047 A1 * | 2/2012 | Imai .......................... | C08J 5/04 |
| | | | 428/403 |
| 2012/0208019 A1 | 8/2012 | Sugiura et al. | |

FOREIGN PATENT DOCUMENTS

| | | |
|---|---|---|
| EP | 0 320 873 A2 | 6/1989 |
| JP | 02-084586 | 3/1990 |
| JP | 7-309979 | 11/1995 |
| JP | 07309979 A * | 11/1995 |
| JP | 9-227740 | 9/1997 |
| JP | 2002-201569 | 7/2002 |
| JP | 2003-246817 | 9/2003 |

(Continued)

OTHER PUBLICATIONS

Notification of Reason for Refusal dated Jun. 29, 2016 in Japanese Patent Application No. 2015-558288 (with unedited computer-generated English translation).

Notification of Reason for Refusal dated Mar. 30, 2016 in Japanese Patent Application No. 2015-558288 (with unedited computer-generated English translation).

Decision of Refusal dated Sep. 21, 2016 in Japanese Patent Application No. 2015-558288 (with unedited computer-generated English translation).

International Search Report dated Sep. 29, 2015 in PCT/JP2015/069300.

(Continued)

*Primary Examiner* — Hui H Chin
(74) *Attorney, Agent, or Firm* — Oblon, McClelland, Maier & Neustadt, L.L.P.

(57) ABSTRACT

A composition improves mechanical strength (e.g., impact resistance and flexural strength), and achieves improved mass productivity by reducing a situation in which a strand fuzzes during extrusion. The composition includes a conjugated diene-based polymer (A), fibers (B), and a thermoplastic resin (C), the composition including the conjugated diene-based polymer (A) in a ratio of 0.05 to 30 parts by mass based on 100 parts by mass of the thermoplastic resin (C), and including the fibers (B) in a ratio of 3 to 150 parts by mass based on 100 parts by mass of the thermoplastic resin (C), wherein the conjugated diene-based polymer (A) includes at least one functional group selected from the group consisting of an alkoxysilyl group and an amino group.

6 Claims, No Drawings

(56) References Cited

FOREIGN PATENT DOCUMENTS

| | | |
|---|---|---|
| JP | 2005-538917 | 12/2005 |
| JP | 2007-308611 | 11/2007 |
| JP | 2012-116916 | 6/2012 |
| JP | 5178228 B2 | 4/2013 |
| JP | 2014-55264 | 3/2014 |
| JP | 5433949 B2 | 3/2014 |
| WO | WO 2005/073291 A1 | 8/2005 |
| WO | WO 2010/107022 A1 | 9/2010 |
| WO | WO 2011/030784 A1 | 3/2011 |
| WO | WO 2013/125628 A1 | 8/2013 |

OTHER PUBLICATIONS

Notification of Reason for Refusal dated Jun. 29, 2016 in Japanese Patent Application No. 2015-558288 558288 (with unedited computer-generated English translation).
Decision of Refusal dated Sep. 21, 2016 in Japanese Patent Application No. 2015-558288 558288 (with unedited computer-generated English translation).
Partial Supplementary European Search Report dated Mar. 1, 2018 in European Patent Application No. 15822315.6, 10 pages.
European Search Report dated Jun. 22, 2018, in corresponding European Patent Application No. 15822315.6.
Japanese Office Action dated Nov. 21, 2018, in Japanese counterpart Patent Application No. 2015-237386 (with Computer-Generated English-language Translation).

\* cited by examiner

SIZING AGENT, COMPOSITION, AND FORMED ARTICLE

TECHNICAL FIELD

The present invention relates to a sizing agent, a composition that includes fibers that have been treated with the sizing agent, and a formed (molded) article that is obtained by forming (molding) the composition. The invention also relates to a thermoplastic composition in which fibers are dispersed using a conjugated diene-based polymer that has been modified with a specific functional group.

BACKGROUND ART

A fiber-reinforced plastic (FRP) is a material produced by binding reinforcing fibers (e.g., glass fibers and carbon fibers) using a resin. The FRP is a composite material that exhibits excellent mechanical strength, heat resistance, formability, and the like. Therefore, the FRP is widely used in a wide variety of fields including the airplane industry, the space industry, the vehicle industry, the building material industry, the sports industry, and the like.

In particular, a carbon fiber-reinforced plastic (CFRP) is characterized by high strength and reduced weight. For example, a thermosetting epoxy resin is mainly reinforced using carbon fibers, and is used as a structural material for producing an airplane. In recent years, an FRP that utilizes a thermoplastic resin has attracted attention since the forming (molding) cycle can be reduced, and such an FRP can be recycled.

There is a tendency that the strength of a fiber-reinforced plastic depends largely on the dispersion state of the reinforcing fibers. Therefore, the strength of a fiber-reinforced plastic has been increased by increasing the content of the reinforcing fibers. For example, Patent Literature 1 discloses a cellulose fiber-containing polyolefin-based composition that includes cellulose fibers having a predetermined average fiber diameter, and a modified olefin-based polymer. Patent Literature 2 discloses a rubber composition that is obtained by mixing and drying a rubber latex and a slurry, the slurry being prepared by dispersing modified cellulose nanofibers in water, and adding a silane coupling agent to the dispersion. Patent Literature 3 discloses a fiber-reinforced composition that is prepared by dispersing modified resin particles in a matrix resin that includes a plurality of resins, and includes a fibrous filler. Patent Literature 4 discloses a reinforced polyolefin composition that includes a polyolefin resin, a modified polyolefin resin, and glass fibers that have been treated with a sizing agent that includes an aminosilane-based coupling agent.

CITATION LIST

Patent Literature

PTL 1: Japanese Patent No. 5433949
PTL 2: Japanese Patent No. 5178228
PTL 3: WO2010/107022
PTL 4: JP-A-7-309979

SUMMARY OF INVENTION

Technical Problem

However, the techniques disclosed in Patent Literature 1 to 4 have problems in that the production method is complex, and cannot achieve high mass productivity, and it is difficult to improve the mechanical strength (e.g., impact resistance and flexural strength) of the FRP.

An object of several aspects of the invention is to solve at least some of the above problems, and provide a composition that can improve mechanical strength (e.g., impact resistance and flexural strength), and achieve improved mass productivity by reducing a situation in which a strand fuzzes during extrusion.

Solution to Problem

The invention was conceived in order to solve at least some of the above problems, and may be implemented as described below (see the following aspects and application examples).

<Application Example 1>

According to one aspect of the invention, a sizing agent includes a conjugated diene-based polymer (A) and a liquid medium, wherein the conjugated diene-based polymer (A) includes at least one functional group selected from the group consisting of an alkoxysilyl group and an amino group.

<Application Example 2>

In the sizing agent according to Application Example 1, the conjugated diene-based polymer (A) may be dispersed in the liquid medium in the form of particles having an average particle size of 0.02 to 100 micrometers.

<Application Example 3>

The sizing agent according to Application Example 1 or 2 may include the liquid medium in a ratio of 100 to 10,000 parts by mass based on 100 parts by mass of the conjugated diene-based polymer (A).

<Application Example 4>

According to another aspect of the invention, a composition includes fibers (B) and a thermoplastic resin (C), the fibers (B) having been treated with the sizing agent according to any one of Application Examples 1 to 3.

<Application Example 5>

According to another aspect of the invention, a composition includes a conjugated diene-based polymer (A), fibers (B), and a thermoplastic resin (C), the composition including the conjugated diene-based polymer (A) in a ratio of 0.05 to 30 parts by mass based on 100 parts by mass of the thermoplastic resin (C), and including the fibers (B) in a ratio of 3 to 150 parts by mass based on 100 parts by mass of the thermoplastic resin (C), wherein the conjugated diene-based polymer (A) includes at least one functional group selected from the group consisting of an alkoxysilyl group and an amino group.

<Application Example 6>

In the composition according to Application Example 4 or 5, the fibers (B) may be at least one type of fibers selected from the group consisting of carbon fibers, glass fibers, and cellulose fibers.

<Application Example 7>

In the composition according to any one of Application Examples 4 to 6, the thermoplastic resin (C) may be at least one thermoplastic resin selected from the group consisting of a polyamide, an olefin-based resin, and polyphenylene sulfide.

<Application Example 8>

In the composition according to any one of Application Examples 4 to 7, the conjugated diene-based polymer (A) may include two or more polymer blocks selected from polymer blocks A to D, the polymer block A being a polymer block that includes a repeating unit derived from an aromatic alkenyl compound in a ratio of 80 mass % or more, the polymer block B being a polymer block that includes a repeating unit derived from a conjugated diene in a ratio of 80 mass % or more, and has a vinyl bond content of less than 30 mol %, the polymer block C being a polymer block that includes a repeating unit derived from a conjugated diene in a ratio of 80 mass % or more, and has a vinyl bond content of 30 to 90 mol %, and the polymer block D being a random copolymer block that includes a repeating unit derived from a conjugated diene and a repeating unit derived from an aromatic alkenyl compound, and excludes the polymer blocks A to C.

<Application Example 9>

In the composition according to any one of Application Examples 4 to 8, the conjugated diene-based polymer (A) may have been hydrogenated.

<Application Example 10>

According to a further aspect of the invention, a formed article is obtained by forming the composition according to any one of Application Examples 4 to 9.

Advantageous Effects of Invention

The compositions according to the aspects of the invention can produce a formed article that exhibits excellent mechanical strength (e.g., impact resistance and flexural strength), and improve mass productivity by reducing a situation in which the surface of the formed article fuzzes during extrusion.

DESCRIPTION OF EMBODIMENTS

The exemplary embodiments of the invention are described in detail below. Note that the invention is not limited to the following exemplary embodiments. It is intended that the invention includes various modifications that can be implemented without departing from the scope of the invention.

Note that the term "conjugated diene-based polymer (A)" may be referred to herein as "component (A)", the term "fibers (B)" may be referred to herein as "component (B)", and the term "thermoplastic resin (C)" may be referred to herein as "component (C)".

1. Composition

When a load (e.g., flexural load) is applied to an FRP formed article, cracks normally occur at the interface between the fibers and the matrix resin. The cracks are propagated through the interface between the fibers and the matrix resin to induce cracks across the formed article, whereby the formed article breaks. In particular, when a load is applied to the FRP formed article, stress concentration easily occurs at the end of the fibers to induce cracks. When the fibers have a short length, the ratio of the end of the fibers per weight relatively increases, and the FRP formed article tend to more easily produce cracks. Therefore, a formed article that is produced using short fibers tends to exhibit decreased mechanical strength.

In order to suppress the occurrence of cracks due to the above mechanism, it is necessary to increase the interfacial adhesion between the fibers and the matrix resin. A composition according to one embodiment of the invention that implements such an increase in interfacial adhesion includes a conjugated diene-based polymer (A), fibers (B), and a thermoplastic resin (C), the composition including the conjugated diene-based polymer (A) in a ratio of 0.05 to 30 parts by mass based on 100 parts by mass of the thermoplastic resin (C), and including the fibers (B) in a ratio of 3 to 150 parts by mass based on 100 parts by mass of the thermoplastic resin (C), wherein the conjugated diene-based polymer (A) includes at least one functional group selected from the group consisting of an alkoxysilyl group and an amino group. Each component included in the composition according to one embodiment of the invention is described below.

1.1. Conjugated Diene-Based Polymer (A)

The composition according to one embodiment of the invention includes the conjugated diene-based polymer (A). It is considered that the component (A) improves the dispersibility of the component (B) in the composition. It is considered that the component (B) and the component (C) are strongly bonded to each other within a formed article according to one embodiment of the invention, so that the occurrence of cracks at the interface between the component (B) and the component (C) when a load (e.g., flexural load) is applied to the formed article is suppressed, and the mechanical strength (e.g., flexural strength, Charpy unnotched impact strength, and falling weight impact strength) of the formed article is improved.

The component (A) used in connection with one embodiment of the invention includes at least one functional group selected from the group consisting of an alkoxysilyl group and an amino group. At least one functional group selected from the group consisting of an alkoxysilyl group and an amino group may be incorporated in (provided to) the component (A) using an arbitrary method. For example, at least one functional group selected from the group consisting of an alkoxysilyl group and an amino group may be incorporated in the component (A) using a method that incorporates at least one functional group selected from the group consisting of an alkoxysilyl group and an amino group in the component (A) (polymer) using a modifier that includes the desired functional group, a method that polymerizes a monomer that includes the desired functional group to obtain the component (A), or the like. It suffices that the component (A) include at least one functional group selected from the group consisting of an alkoxysilyl group and an amino group. The component (A) may be provided with a structure in which at least one functional group selected from the group consisting of an alkoxysilyl group and an amino group is introduced, by reacting the component (A) with a compound that includes at least one functional group selected from the group consisting of an alkoxysilyl group and an amino group. Note that the term "amino group" used herein refers to one of a primary amino group, a secondary amino group, and a tertiary amino group. The amino group may be protected with a protecting group.

The number of amino groups per molecular chain of the component (A) is preferably 1 or more, more preferably 5 or more, and particularly preferably 10 or more. The number of amino groups per molecular chain of the component (A) is preferably adjusted to 100 or less, and more preferably 50 or less, in order to prevent a situation in which the polymer gels during production. The number of amino groups included in the component (A) may be quantitatively determined using an arbitrary method. For example, the number of amino groups included in the component (A) may be quantitatively determined using an IR method, an NMR method, an amine titration method, or the like. When the number of amino groups included in the component (A) is within the above range, it is considered that adhesion to the component (B) further increases, and the mechanical strength of a formed article obtained by forming the composition according to one embodiment of the invention is further improved.

The polystyrene-equivalent weight average molecular weight (Mw) of the component (A) determined by gel permeation chromatography (GPC) is preferably 30,000 to 2,000,000, more preferably 40,000 to 1,000,000, and particularly preferably 50,000 to 500,000. The melt flow rate (MFR) (230° C., 2.16 kg) of the component (A) measured in accordance with JIS K 7210 is preferably 0.1 to 100 g/10 min, more preferably 0.2 to 50 g/10 min, and particularly preferably 0.3 to 30 g/10 min.

The component (A) may include a repeating unit derived from a conjugated diene, and an optional repeating unit derived from a monomer other than a conjugated diene. The component (A) may be a block polymer that includes repeating units formed by an identical monomer, or may be a random polymer in which different monomers are randomly polymerized. It is preferable that the component (A) be a block polymer in order to ensure that the component (A) and the component (C) exhibit improved mutual solubility, and the component (B) and the component (C) are more strongly bonded to each other. It is preferable that the component (A) be a hydrogenated polymer from the viewpoint of improving the weatherability and the mechanical strength of the resulting formed article. The conjugated diene-based polymer (A) is described in detail below.

1.1.1. Conjugated Diene

The component (A) includes a repeating unit derived from a conjugated diene. Examples of the conjugated diene include 1,3-butadiene, isoprene, 2,3-dimethyl-1,3-butadiene, 1,3-pentadiene, 2-methyl-1,3-octadiene, 1,3-hexadiene, 1,3-cyclohexadiene, 4,5-diethyl-1,3-octadiene, 3-butyl-1,3-octadiene, myrcene, farnesene, chloroprene, and the like. It is preferable that the component (A) include a repeating unit derived from 1,3-butadiene or isoprene as the repeating unit derived from a conjugated diene so that a formed article that exhibits excellent mechanical strength and excellent cold resistance can be obtained.

1.1.2. Monomer Other than Conjugated Diene

The component (A) may include a repeating unit derived from a compound other than a conjugated diene. An aromatic alkenyl compound is preferable as such a compound. An unsaturated monomer represented by the following general formula (1) is preferable as the aromatic alkenyl compound since a formed article that exhibits excellent mechanical strength, excellent heat resistance, and excellent cold resistance can be obtained.

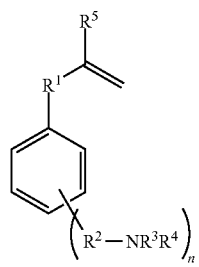

(1)

wherein $R^1$ is a single bond or a divalent hydrocarbon group having 1 to 3 carbon atoms, $R^3$ and $R^4$ are independently an alkyl group having 1 to 3 carbon atoms, or a trialkylsilyl group having 3 to 18 carbon atoms, or one of $R^3$ and $R^4$ is a trialkylsilyl group having 3 to 18 carbon atoms, and the other of $R^3$ and $R^4$ is an alkyl group having 1 to 20 carbon atoms, an aryl group having 6 to 20 carbon atoms, an aralkyl group having 7 to 20 carbon atoms, or an organosiloxy group having 1 to 100 carbon atoms, $R^2$ is a single bond, an alkylene group having 1 to 20 carbon atoms, or an alkylidene group having 1 to 20 carbon atoms, $R^5$ is a hydrogen atom or a methyl group, and n is an integer from 0 to 3.

Specific examples of the aromatic alkenyl compound include styrene, tert-butylstyrene, alpha-methyl styrene, p-methylstyrene, p-ethylstyrene, divinylbenzene, 1,1-diphenylstyrene, 1-vinylnaphthalene, 2-vinylnaphthalene, 2-vinylanthracene, 9-vinylanthracene, p-vinylbenzyl propyl ether, p-vinylbenzyl butyl ether, p-vinylbenzyl hexyl ether, p-vinylbenzyl pentyl ether, m-N,N-diethylaminoethylstyrene, p-N,N-diethylaminoethylstyrene, p-N,N-dimethylaminoethylstyrene, o-vinylbenzyldimethylamine, p-vinylbenzyldimethylamine, p-vinylbenzyldiethylamine, p-vinylbenzyldi(n-propyl)amine, p-vinylbenzyldi(n-butyl)amine, vinylpyridine, 2-vinylbiphenyl, 4-vinylbiphenyl, p-[N,N-bis(trimethylsilyl)amino]styrene, p-[N,N-bis(trimethylsilyl)aminomethyl]styrene, p-{2-[N,N-bis(trimethylsilyl)amino]ethyl}styrene, m-[N,N-bis(trimethylsilyl)amino]styrene, p-(N-methyl-N-trimethylsilylamino)styrene, p-(N-methyl-N-trimethylsilylaminomethyl)styrene, and the like. These monomers may be used either alone or in combination. It is preferable that the component (A) include a repeating unit derived from styrene or p-methylstyrene as the repeating unit derived from a compound other than a conjugated diene so that a formed article that exhibits excellent mechanical strength, excellent heat resistance, and excellent cold resistance can be obtained.

When the component (A) includes a repeating unit derived from an aromatic alkenyl compound, it is preferable that the component (A) include the repeating unit derived from a conjugated diene and the repeating unit derived from an aromatic alkenyl compound in a mass ratio of 100:0 to 20:80, and more preferably 97:3 to 40:60, so that the glass transition temperature of the component (A) is maintained at a moderate level, and the mechanical strength and the cold resistance of the resulting formed article are improved.

1.1.3. Configuration of Polymer Blocks

It is preferable that the component (A) be a block copolymer so that the formability of the composition and the mutual solubility are improved. It is more preferable that the component (A) be a block polymer that includes two or more polymer blocks selected from the following polymer blocks A to D.

Polymer block A: A polymer block that includes a repeating unit derived from an aromatic alkenyl compound in a ratio of 80 mass % or more Polymer block B: A polymer block that includes a repeating unit derived from a conjugated diene in a ratio of 80 mass % or more, and has a vinyl bond content of less than 30 mol %

Polymer block C: A polymer block that includes a repeating unit derived from a conjugated diene in a ratio of 80 mass % or more, and has a vinyl bond content of 30 to 90 mol %

Polymer block D: A random copolymer block that includes a repeating unit derived from a conjugated diene and a repeating unit derived from an aromatic alkenyl compound, and excludes the polymer blocks A to C When the component (A) includes the polymer block C, molecular entanglement and mutual solubility with an olefin-based resin (i.e., component (C)) are improved, and the mechanical strength of the resulting formed article is further improved. The vinyl bond content in the polymer block C is more preferably 50 to 90 mol %, and particularly preferably 60 to 90 mol %. It is preferable that the polymer block C has been hydrogenated so that molecular entanglement and mutual solubility with an olefin-based resin are significantly improved.

When the polymer block is a copolymer block that is formed by two or more compounds, the polymer block may be a random polymer block, or may be a tapered polymer block in which the content of a repeating unit derived from an aromatic alkenyl compound, or the content of a repeating unit derived from a conjugated diene continuously changes within the polymer block.

Note that the term "vinyl bond content" used herein refers to the total content (mol %) of repeating units derived from a conjugated diene that are included in the unhydrogenated polymer through a 1,2-bond or a 3,4-bond (among a 1,2-bond, a 3,4-bond, and a 1,4-bond). The vinyl bond content (1,2-bond content and 3,4-bond content) may be calculated by infrared absorption spectrometry (Morello method).

Examples of the block polymer that includes two or more polymer blocks selected from the polymer blocks A to D include A-B, A-C, A-D, B-C, B-D, [A-B]x-Y, [A-C]x-Y, [A-D]x-Y, [B-C]x-Y, [B-D]x-Y, [B-A]x-Y, [C-A]x-Y, [D-A]x-Y, A-B-D, A-B-A, A-C-A, A-C-B, A-D-A, B-A-B, [A-B-D]x-Y, [A-B-A]x-Y, [A-C-A]x-Y, [A-C-B]x-Y, [A-D-A]x-Y, [B-A-B]x-Y, A-B-A-B, B-A-B-A, [A-B-A-B]x-Y, A-B-A-B-A, [A-B-A-B-A]x-Y, B-A-B-D, B-A-B-A, B-A-C-A, B-A-C-B, B-A-D-A, [C-A-B-D]x-Y, [C-A-B-A]x-Y, [C-A-C-A]x-Y, [C-A-C-B]x-Y, [C-A-D-A]x-Y, C-A-B-A-B, C-B-A-B-A, C-A-B-A-C, [C-A-B-A-B]x-Y, C-A-B-A-B-A, and [C-A-B-A-B-A]x-Y (wherein x is an integer equal to or larger than 2, and Y is a linking group). When the block polymer has a structure that includes square brackets and Y, the block that is situated closest to Y is bonded directly to Y. For example, when the block polymer has the structure represented by [A-C-B]x-Y, x [A-C-B] are bonded directly to Y through the polymer block B.

When the composition according to one embodiment of the invention is pelletized, it is preferable that the conjugated diene block copolymer include at least one of the polymer block A and the polymer block B as a block component that is situated on the outer side.

It is preferable that the block polymer have the structure represented by A-C-A, A-C-B, [B-C]x-Y, or [A-C]x-Y since a composition in which adhesion between the component (B) and component (C) is improved, and the component (A) and the component (C) exhibit high mutual solubility is obtained. When the block polymer includes the polymer block C, the block polymer exhibits excellent mutual solubility with an olefin-based resin that may be used as the component (C), and an excellent interface-reinforcing effect can be obtained. It is preferable that at least the polymer block A include at least one functional group selected from a group consisting of an alkoxysilyl group and an amino group so that adhesion to the component (B) is improved.

The linking group Y is a structural unit that is derived from a coupling agent. Examples of the coupling agent include a halogen compound such as methyldichlorosilane, methyltrichlorosilane, butyltrichlorosilane, tetrachlorosilane, dibromoethane, tetrachlorotin, butyltrichlorotin, tetrachlorogermanium, and bis(trichlorosilyl)ethane; an epoxy compound such as epoxidized soybean oil; a carbonyl compound such as diethyl adipate, dimethyl adipate, dimethylterephthalic acid, and diethylterephthalic acid; a polyvinyl compound such as divinylbenzene; a polyisocyanate; and the like. These coupling agents may be used either alone or in combination. The reaction temperature employed when effecting the coupling reaction is preferably 0 to 120° C., and more preferably 50 to 100° C. The reaction time is preferably 1 to 30 minutes, and more preferably 5 to 20 minutes.

1.1.4. Hydrogenation

It is preferable that the component (A) be a hydrogenated polymer so that the weatherability and the mechanical strength of the formed article according to one embodiment of the invention are improved. In particular, when an olefin-based resin is used as the component (C), it is possible to significantly improve the molecular entanglement and the mutual solubility of the component (A) and the olefin-based resin, and further improve the adhesion between the component (B) and the component (C) by utilizing a hydrogenated polymer as the component (A).

The hydrogenation rate of the polymer can be controlled by changing the amount of hydrogenation catalyst, the hydrogen pressure or the reaction time employed when effecting the hydrogenation reaction, and the like. For example, the hydrogenation reaction is effected at 20 to 150° C. under a hydrogen pressure of 0.1 to 10 MPa in the presence of a hydrogenation catalyst. The hydrogenation rate is preferably 60% or more, more preferably 80% or more, and particularly preferably 95% or more, based on the double bonds (e.g., vinyl bond). Hydrogenation may be effected after completion of the polymerization reaction, and the modifier may be reacted with the resulting product, or the modifier may be reacted with the product obtained by the polymerization reaction, and hydrogenation may then be effected.

Examples of the hydrogenation catalyst and a specific hydrogenation method include those disclosed in JP-A-1-275605, JP-A-5-271326, JP-A-5-271325, JP-A-5-222115, JP-A-11-292924, JP-A-2000-37632, JP-A-59-133203, JP-A-63-5401, JP-A-62-218403, JP-A-7-90017, JP-B-43-19960, JP-B-47-40473, and the like.

The weight average molecular weight (Mw) of the hydrogenated polymer is preferably 30,000 to 2,000,000, more preferably 40,000 to 1,000,000, and particularly preferably 50,000 to 500,000. When the weight average molecular weight (Mw) of the hydrogenated polymer is within the above range, it is possible to improve the strength and the dimensional stability of the resulting formed article. When the weight average molecular weight (Mw) of the hydrogenated polymer is within the above range, the composition according to one embodiment of the invention has moderate solution viscosity and melt viscosity, and the formability of the composition is further improved. Note that the term "weight average molecular weight" used herein refers to a polystyrene-equivalent weight average molecular weight determined by gel permeation chromatography (GPC).

1.1.5. Method for Producing Component (A)

The component (A) may be produced using the method disclosed in Japanese Patent No. 5402112, Japanese Patent No. 4840140, WO2003/029299, or the like, for example. When the component (A) is a block polymer, the component (A) may be produced using the method disclosed in Japanese Patent No. 3134504, Japanese Patent No. 3360411, Japanese Patent No. 3988495, WO2014/014052, or the like, for example. Specific examples of the method for producing the component (A) include the following production methods (a) to (c). Note that a polymer obtained as described below may optionally be hydrogenated as described above.

1.1.5.1. Production Method (a)

The production method (a) polymerizes a conjugated diene either alone or together with an aromatic alkenyl compound in the presence of at least one of an organic alkali metal compound and an organic alkaline-earth metal compound, and reacts the resulting polymer with a modifier. The polymer may optionally be hydrogenated. When the modifier is a compound that includes an alkoxysilyl group and an amino group, an alkoxysilyl group and an amino group can be simultaneously introduced into the polymer at a high introduction rate.

The polymer is preferably reacted with the modifier at 0 to 120° C. The reaction time is preferably 1 to 30 minutes. The modifier is preferably reacted with the polymer in a ratio of 10 mol % or more.

Examples of the compound that includes an alkoxysilyl group and an amino group include a compound represented by the following general formula (2), a compound represented by the following general formula (3), and a compound represented by the following general formula (4).

<Compound Represented by General Formula (2)>

$$R^6_{(4-m-n)}Si(OR^7)_m X_n \quad (2)$$

In the general formula (2), $R^6$ is an alkyl group having 1 to 20 carbon atoms, an aryl group having 6 to 20 carbon atoms, an aralkyl group having 7 to 20 carbon atoms, or an organosiloxy group having 1 to 100 carbon atoms. A plurality of $R^6$ are either identical to or different from each other when a plurality of $R^6$ are present. $R^7$ is an alkyl group having 1 to 20 carbon atoms, an aryl group having 6 to 20 carbon atoms, or an aralkyl group having 7 to 20 carbon atoms. A plurality of $R^7$ are either identical to or different from each other when a plurality of $R^7$ are present.

X is a group represented by -A-X' (wherein A is an alkylene group having 1 to 20 carbon atoms, and X' is a group that includes at least an N atom). A plurality of X are either identical to or different from each other when a plurality of X are present. Each X may be an independent substituent, or may form a cyclic structure. m and n are an integer from 1 to 3. The sum of m and n is an integer from 2 to 4.

The compounds disclosed in Japanese Patent No. 3988495, WO2014/014052, and the like may be used as the compound represented by the general formula (2). Among these, N,N-bis(trimethylsilyl)aminopropyltrimethoxysilane, N,N-bis(trimethylsilyl)aminopropylmethyldimethoxysilane, N,N-bis(trimethylsilyl)aminopropylmethyldiethoxysilane, N,N-bis(trimethylsilyl)aminopropyldimethylmethoxysilane, N,N-bis(trimethylsilyl)aminopropyldimethylethoxysilane, N-methyl-N-trimethylsilylaminopropylmethyldiethoxysilane, and 1-(3-triethoxysilylpropyl)-2,2,5,5-tetramethyl-aza-2,5-disilacyclopentane are preferable.

<Compound Represented by General Formula (3)>

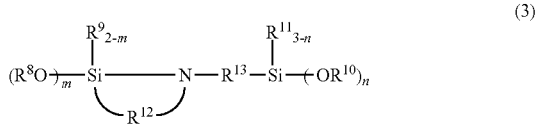

In the general formula (3), $R^8$ to $R^{11}$ are independently an alkyl group having 1 to 20 carbon atoms or an aryl group, $R^{12}$ and $R^{13}$ are an alkylene group having 1 to 20 carbon atoms, m is 1 or 2, and n is an integer from 1 to 3. Note that the total number of alkoxy groups having 1 to 20 carbon atoms included in the compound represented by the general formula (3) is preferably 4 or more.

The compounds disclosed in WO2003/029299, WO2014/014052, and the like may be used as the compound represented by the general formula (3).

<Compound Represented by General Formula (4)>

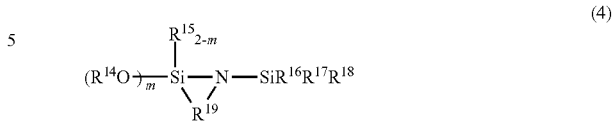

In the general formula (4), $R^{14}$ and $R^{15}$ are independently an alkyl group having 1 to 20 carbon atoms or an aryl group, and $R^{19}$ is an alkylene group having 1 to 20 carbon atoms. $R^{16}$, $R^{17}$, and $R^{18}$ are independently an alkyl group having 1 to 20 carbon atoms or an aryl group, provided that two groups among $R^{16}$, $R^{17}$, and $R^{18}$ are optionally bonded to each other to form a ring together with the silicon atom that is bonded thereto. m is 1 or 2.

Examples of the compound represented by the general formula (4) include 1-trimethylsilyl-2,2-diethoxy-1-aza-2-silacyclopentane, a dimethoxysilyl compound, a methylethoxysilyl compound, an ethylethoxysilyl compound, a methylmethoxysilyl compound, an ethylmethoxysilyl compound, and the like that correspond to the diethoxysilyl compound.

Examples of the organic alkali metal compound include an organolithium compound and an organosodium compound. Among these, an organolithium compound is preferable. Examples of the organolithium compound include an organic monolithium compound, an organic dilithium compound, and an organic polylithium compound.

The compounds disclosed in Japanese Patent No. 3988495, WO2014/014052, and the like may be used as the organolithium compound. Among these, n-butyllithium, sec-butyllithium, tert-butyllithium, and 1,3-phenylenebis(3-methyl-1-phenylpentylidene)bislithium are preferable.

Note that the organic alkali metal compound may be an organic alkali metal compound that includes an amino group. Examples of such a compound include a compound represented by the following general formula (5) and a compound represented by the following general formula (6).

In the general formula (5), $R^{20}$ and $R^{21}$ are a trialkylsilyl group having 3 to 18 carbon atoms, or one of $R^{20}$ and $R^{21}$ is a trialkylsilyl group having 3 to 18 carbon atoms, and the other of $R^{20}$ and $R^{21}$ is an alkyl group having 1 to 20 carbon atoms, an aryl group having 6 to 20 carbon atoms, an aralkyl group having 7 to 20 carbon atoms, or an organosiloxy group having 1 to 100 carbon atoms. $R^{22}$ is an alkylene group having 1 to 20 carbon atoms, or an alkylidene group having 1 to 20 carbon atoms.

In the general formula (6), $R^{23}$ is an alkylene group having 1 to 20 carbon atoms, or an alkylidene group having 1 to 20 carbon atoms. $R^{24}$ is an alkyl group having 1 to 20 carbon atoms, an aryl group having 6 to 20 carbon atoms, an aralkyl group having 7 to 20 carbon atoms, or an organosiloxy group having 1 to 100 carbon atoms.

The compounds disclosed in Japanese Patent No. 3988495, WO2014/014052, and the like may be used as the organic alkali metal compound represented by the general formula (5) and the organic alkali metal compound represented by the general formula (6).

Examples of the organic alkaline-earth metal compound include an organomagnesium compound, an organocalcium compound, an organostrontium compound, and an organobarium compound. Among these, an organolithium compound is preferable. Specific examples of the organic alkaline-earth metal compound include ethylbutylmagnesium, di-n-butylmagnesium, di-n-hexylmagnesium, diethoxycalcium, calcium distearate, di-t-butoxystrontium, diethoxybarium, diisopropoxybarium, diethylmercaptobarium, di-t-butoxybarium, diphenoxybarium, diethylaminobarium, barium distearate, diketylbarium, and the like.

These organic alkali metal compounds and organic alkaline-earth metal compounds may be used either alone or in combination. The organic alkali metal compound and the organic alkaline-earth metal compound are preferably used in a ratio of 0.02 to 15 parts by mass based on 100 parts by mass of the monomer (e.g., conjugated diene and additional monomer) in total.

1.1.5.2. Production Method (b)

The production method (b) reacts a polymer obtained by polymerizing a conjugated diene and an aromatic alkenyl compound, or polymerizing a conjugated diene, an aromatic alkenyl compound, and an additional monomer, with a modifier in the presence of at least one compound selected from the group consisting of an organic alkali metal compound and an organic alkaline-earth metal compound, and at least one aliphatic amine compound. Examples of the organic alkali metal compound, the organic alkaline-earth metal compound, and the modifier include those mentioned above in connection with the production method (a) (see "1.1.5.1. Production method (a)").

An aliphatic tertiary amine is preferable as the aliphatic amine compound. Examples of the aliphatic tertiary amine include an ethylenediamine derivative, a propylenediamine derivative, and polyethylenimine. Among these, an ethylenediamine derivative is preferable, and N,N, N',N'-tetramethylethylenediamine is more preferable.

The production method (b) subjects the polymer that includes a repeating unit derived from the aromatic alkenyl compound to the modification reaction in a solvent. The block copolymer that has been isolated may be dissolved in the solvent, or the copolymer solution obtained by the polymerization reaction or the hydrogenation reaction may be used directly.

The organic alkali metal compound and the organic alkaline-earth metal compound are preferably used in a 0.01 to 5-fold molar ratio with respect to the aromatic alkenyl compound. The aliphatic amine compound is preferably used in a 0.8 to 5-fold molar ratio with respect to the organic alkali metal compound. The modifier is preferably used in a 0.5 to 2-fold molar ratio with respect to the organic alkali metal compound.

A first-stage reaction is effected by adding at least one compound selected from the group consisting of the organic alkali metal compound and the organic alkaline-earth metal compound, and the aliphatic amine compound, to the copolymer solution. At least one compound selected from the group consisting of the organic alkali metal compound and the organic alkaline-earth metal compound, and the aliphatic amine compound, may be added in an arbitrary order. At least one compound selected from the group consisting of the organic alkali metal compound and the organic alkaline-earth metal compound, and the aliphatic amine compound, may be added at the same time. The reaction temperature is preferably 20 to 120° C. The reaction time is preferably 0 to 120 minutes. A second-stage reaction is effected by adding the modifier to the reaction solution obtained by the first-stage reaction. The reaction temperature is preferably 20 to 120° C. The reaction time is preferably 0 to 120 minutes. The product obtained by the second-stage reaction may optionally be hydrogenated.

1.1.5.3. Production Method (c)

The production method (c) polymerizes a conjugated diene either alone or together with an aromatic alkenyl compound in the presence of at least one of an organic alkali metal compound and an organic alkaline-earth metal compound, and reacts the resulting polymer with a peroxide and a modifier in a solution or a mixer (e.g., extruder). Examples of the organic alkali metal compound, the organic alkaline-earth metal compound, and the modifier include those mentioned above in connection with the production method (a) (see "1.1.5.1. Production method (a)").

The peroxide is not particularly limited. Examples of the peroxide include an organic peroxide such as 1,1-di-t-butylperoxy-3,3,5-trimethylcyclohexane, di-t-butyl peroxide, dicumyl peroxide, t-butylcumyl peroxide, 2,5-dimethyl-2,5-di(t-butylperoxy)hexane, 2,5-dimethyl-2,5-di(t-butylperoxy)hexyne-3, and 1,3-bis(t-butylperoxyisopropyl)benzene, and the like. These peroxides may be used either alone or in combination. The peroxide is preferably used in a ratio of 0.001 to 3 parts by mass based on 1 part by mass of the modifier.

The mixing-heating method is not particularly limited. A batch-type melt mixer such as an open mixing roll, an internal Banbury mixer, or a kneader, or a continuous melt mixer such as a single-screw extruder, a co-rotating continuous twin-screw extruder, or a counter-rotating continuous twin-screw extruder, may be used. The heating temperature is preferably 100 to 300° C. The heating time is preferably 10 to 900 seconds.

1.2. Fibers (B)

A known material may be used as the fibers (B). For example, one type of fibers, or two or more types of fibers, selected from inorganic fibers such as alumina fibers, glass fibers, rock wool, potassium titanate fibers, zirconia fibers, ceramic fibers, silicon fibers, silicon nitride fibers, silica-alumina fibers, kaolin fibers, bauxite fibers, kayanoid fibers, boron fibers, boron nitride fibers, magnesia fibers, and potassium titanate whisker, and organic fibers such as polyester-based fibers, polyamide-based fibers, polyimide-based fibers, polyvinyl alcohol modified fibers, polyvinyl chloride fibers, polypropylene fibers, polybenzimidazole fibers, acrylic fibers, carbon fibers, phenol fibers, nylon fibers, and cellulose (nano)fibers may be used as the component (B). Among these, cellulose fibers, carbon fibers, and glass fibers are preferable, and carbon fibers are particularly preferable.

The lower limit of the average fiber length of the component (B) is preferably 80 nm or more, more preferably 1 micrometer or more, and particularly preferably 5 micrometers or more. The upper limit of the average fiber length is preferably 100 mm or less, more preferably 50 mm or less, and particularly preferably 30 mm or less. The lower limit of the average fiber diameter of the component (B) is preferably 1 nm or more, more preferably 5 nm or more, and particularly preferably 10 nm or more. The upper limit of the average fiber diameter is preferably 10 mm or less, more preferably 5 mm or less, still more preferably 3 mm or less, and particularly preferably 1 mm or less.

The average fiber length and the average fiber diameter of the component (B) may be measured using a known method. For example, the component (B) is observed using a microscope, the fiber length and the fiber diameter are measured with respect to 300 fibers that have been randomly selected, and the average values thereof are calculated to be the average fiber length and the average fiber diameter. The average fiber diameter and the average fiber length of the fibers included in the formed article may be determined as described below. Specifically, the formed article is subjected to a high-temperature ashing treatment, a dissolution treatment using a solvent, a decomposition treatment using a reagent, or the like to collect a filler residue. The filler residue is observed using a microscope, the fiber length and the fiber diameter are measured with respect to 300 fibers that have been randomly selected, and the average values thereof are calculated to be the average fiber length and the average fiber diameter.

The ratio (aspect ratio) of the average fiber length to the average fiber diameter of the component (B) is preferably 2 to 8,000, more preferably 2.5 to 2,000, and particularly preferably 3 to 1,000. When the aspect ratio of the component (B) is within the above range, it is possible to improve the mechanical properties of the resulting formed article. When the aspect ratio of the component (B) is within the above range, it is possible to prevent a situation in which the formed article is deformed or becomes anisotropic, and ensures that the formed article exhibits excellent external appearance. The component (B) may be used in the form of a fiber bundle (strand). The fiber bundle can be easily prepared by bundling short fibers using a sizing agent. The number of fibers that form the fiber bundle may be appropriately set within the range from 1,000 (1K) to 60,000 (60K) taking account of the application. The component (B) may optionally be surface-modified with a functional group.

Examples of the functional group include a (meth)acryloyl group, an amide group, an amino group, an isocyanate group, an imide group, a urethane group, an ether group, an epoxy group, a carboxy group, a hydroxy group, an acid anhydride group, and the like.

The functional group may be introduced into the component (B) using an arbitrary method. For example, the functional group may be introduced into the component (B) using a method that introduces the functional group into the component (B) by directly reacting the component (B) and a sizing agent, a method that applies a sizing agent to the component (B), or impregnates the component (B) with a sizing agent, and optionally solidifies the sizing agent, or the like. More specifically, the functional group may be introduced into the component (B) using the method disclosed in JP-A-2013-147763 or the like.

The sizing agent may be one material, or two or more materials, selected from the group consisting of an acid, an acid anhydride, an alcohol, a halogenation reagent, an isocyanate, an alkoxysilane, a cyclic ether such as oxirane (epoxy), an epoxy resin, a urethane resin, a urethane-modified epoxy resin, an epoxy-modified urethane resin, an amine-modified aromatic epoxy resin, an acrylic resin, a polyester resin, a phenolic resin, a polyamide resin, a polycarbonate resin, a polyimide resin, a polyetherimide resin, a bismaleimide resin, a polysulfone resin, a polyether sulfone resin, a polyvinyl alcohol resin, and a polyvinylpyrrolidone resin.

The sizing agent may be used in an arbitrary amount when used to prepare a fiber bundle using the component (B). For example, the sizing agent is used in a ratio of 0.1 to 10 parts by mass based on 100 parts by mass of the component (B).

Cellulose fibers, carbon fibers, and glass fibers that may suitably be used in connection with one embodiment of the invention are described below.

1.2.1. Cellulose Fibers

Cellulose fibers may be produced using a plant-derived fiber material, an animal-derived fiber material, or a microorganism-derived fiber material. Two or more materials among these materials may be used in combination. Examples of the plant-derived fiber material include pulp and a plant material. Examples of the pulp include recycled pulp, kraft pulp, and mechanical pulp. These materials may be used either alone or in combination.

1.2.2. Carbon Fibers

Examples of preferable carbon fibers include PAN-based carbon fibers produced using polyacrylonitrile fibers as a raw material, pitch-based carbon fibers produced using coal tar or petroleum pitch as a raw material, cellulose-based carbon fibers produced using viscose rayon, cellulose acetate, or the like as a raw material, vapor-grown carbon fibers produced using a hydrocarbon or the like as a raw material, graphitized fibers thereof, and the like. Note that the carbon fibers may be carbon fibers obtained by forming carbon nanotubes or graphenes in the shape of fibers. The carbon fibers may be recycled carbon fibers. These carbon fibers may be used alone, or may be used in a state in which two or more types of carbon fibers are blended.

1.2.3. Glass Fibers

The glass fibers are not particularly limited. The glass fibers may be produced using various types of glass such as A-glass, C-glass, E-glass, and S-glass. The glass fibers may optionally include $TiO_2$, $SO_3$, $P_2O_5$, CaO, MgO, $B_2O_3$, and the like.

1.3. Thermoplastic Resin (C)

The composition according to one embodiment of the invention includes the thermoplastic resin (C). Examples of the component (C) include an olefin-based resin, a polyester-based resin such as polyethylene terephthalate, polybutylene terephthalate, and polylactic acid, an acrylic-based resin, a styrene-based resin such as polystyrene, an AS resin, and an ABS resin, a polyamide such as nylon 6, nylon 6,6, nylon 12, a semi-aromatic polyamide (nylon 6T, nylon 6I, and nylon 9T), and a modified polyamide, a polycarbonate, polyacetal, a fluororesin, a modified polyphenylene ether, polyphenylene sulfide and a derivative thereof, a polyester elastomer, a polyarylate, a liquid crystal polymer (wholly aromatic liquid crystal polymer and semi-aromatic liquid crystal polymer), a polysulfone, polyethersulfone, polyether ether ketone, polyetherimide, a polyamide-imide, and a polyimide. These thermoplastic resins may be used either alone or in combination. Among these, a polyamide, polyphenylene sulfide and a derivative thereof, polyetherimide, polyether ether ketone, and an olefin-based resin are preferable, and an olefin-based resin is more preferable.

The weight average molecular weight (Mw) of the component (C) is preferably 5,000 to 1,000,000, more preferably 10,000 to 900,000, and particularly preferably 20,000 to 800,000. The ratio (Mw/Mn) of the weight average molecular weight (Mw) to the number average molecular weight (Mn) of the component (C) is not particularly limited, but is preferably 1 to 10, and more preferably 2 to 7.

A polyamide, an olefin-based resin, and polyphenylene sulfide and a derivative thereof that may suitably be used in connection with one embodiment of the invention are described below.

1.3.1. Polyamide

A homopolymer, a copolymer, a homopolymer mixture, a copolymer mixture, a copolymer-homopolymer mixture, and the like that are obtained by appropriately combining polyamide-forming monomers (e.g., epsilon-caprolactam, adipic acid, sebacic acid, dodecanedioic acid, isophthalic acid, terephthalic acid, hexamethylenediamine, tetramethylenediamine, 2-methylpentamethylenediamine, 2,2,4-trimethylhexamethylenediamine, 2,4,4-trimethylhexamethylenediamine, m-xylylenediamine, and bis(3-methyl-4-aminocyclohexyl)methane) may be used as the polyamide.

1.3.2. Olefin-Based Resin

Examples of the olefin-based resin include a homopolymer of an alpha-olefin having about 2 to 8 carbon atoms, such as ethylene, propylene, and 1-butene; a binary or ternary (co)polymer of an alpha-olefin having about 2 to 8 carbon atoms, such as ethylene, propylene, and 1-butene, and an alpha-olefin having about 2 to 18 carbon atoms, such as ethylene, propylene, 1-butene, 3-methyl-1-butene, 1-pentene, 4-methyl-1-pentene, 4,4-dimethyl-1-pentene, 1-hexene, 4-methyl-1-hexene, 1-heptene, 1-octene, 1-decene, and 1-octadecene; and the like.

Specific examples of the olefin-based resin include an ethylene-based resin such as an ethylene homopolymer such as branched low-density polyethylene and linear high-density polyethylene, an ethylene-propylene copolymer, an ethylene-1-butene copolymer, an ethylene-propylene-1-butene copolymer, an ethylene-4-methyl-1-pentene copolymer, an ethylene-1-hexene copolymer, an ethylene-1-heptene copolymer, and an ethylene-1-octene copolymer; a propylene-based resin such as a propylene homopolymer, a propylene-ethylene copolymer, a propylene-ethylene-1-butene copolymer, a propylene-ethylene-4-methyl-1-pentene copolymer, and a propylene-ethylene-1-hexene copolymer; a 1-butene-based resin such as a 1-butene homopolymer, a 1-butene-ethylene copolymer, and a 1-butene-propylene copolymer; a 4-methyl-1-pentene-based resin such as a 4-methyl-1-pentene homopolymer and a 4-methyl-1-pentene-ethylene copolymer; and the like.

These olefin-based resins may be used either alone or in combination. Among these, an ethylene-based resin and a propylene-based resin are preferable, a propylene-based resin is more preferable, an ethylene-propylene copolymer and a propylene homopolymer are still more preferable, and a propylene homopolymer is particularly preferable. In particular, when the component (A) is a block polymer that includes a conjugated diene polymer block that includes a repeating unit derived from a conjugated diene in a ratio of 80 mass % or more, and has a vinyl bond content of 30 to 90 mol %, a propylene-based resin exhibits particularly excellent mutual solubility with the component (A). In this case, the vinyl bond content in the polymer block is more preferably 50 to 90 mol %, and particularly preferably 60 to 90 mol %. It is preferable to hydrogenate the component (A) since mutual solubility and molecular entanglement with a propylene-based resin are significantly improved.

The weight average molecular weight (Mw) of the olefin-based resin is preferably 5,000 to 1,000,000, more preferably 10,000 to 900,000, and particularly preferably 20,000 to 800,000, since the mechanical strength of the resulting formed article is improved. The ratio (Mw/Mn) of the weight average molecular weight (Mw) to the number average molecular weight (Mn) of the olefin-based resin is preferably 1 to 10, and more preferably 2 to 7.

A crystalline polyolefin and an amorphous polyolefin may be used in combination with the olefin-based resin. Examples of the amorphous polyolefin include a homopolymer such as atactic polypropylene and atactic poly-1-butene, a copolymer of propylene and an alpha-olefin other than propylene, a copolymer of 1-butene and an alpha-olefin other than 1-butene, and the like.

1.3.3. Polyphenylene Sulfide and Derivative Thereof

Polyphenylene sulfide and a derivative thereof that may suitably be used in connection with one embodiment of the invention are not particularly limited as long as the advantageous effects of the invention can be achieved. For example, polyphenylene sulfide, polyphenylene sulfide ketone, polybiphenylene sulfide, polyphenylene sulfide sulfone, and the like may be used. Among these, polyphenylene sulfide may preferably be used.

1.4. Additional Component

The composition according to one embodiment of the invention may include an additive (e.g., aging preventive, antioxidant, weatherproof agent, metal deactivator, light stabilizer, thermal stabilizer, UV absorber, antibacterial/antifungal agent, deodorant, conductive agent, dispersant, softener, plasticizer, cross-linking agent, co-cross-linking agent, vulcanizing agent, vulcanization aid, blowing agent, blowing aid, colorant, flame retardant, damping agent, nucleating agent, neutralizer, lubricant, anti-blocking agent, dispersant, flow improver, and release agent) in addition to the components described above.

1.5. Content of Each Component

The lower limit of the content ratio of the component (A) in the composition according to one embodiment of the invention is preferably 0.05 parts by mass or more, more preferably 0.5 parts by mass or more, and particularly preferably 1 part by mass or more, based on 100 parts by mass of the component (C). If the lower limit of the content ratio of the component (A) is less than the above range, the mechanical properties (e.g., impact resistance and flexural strength) of the resulting formed article may not be improved. The upper limit of the content ratio of the component (A) is preferably 30 parts by mass or less, more preferably 20 parts by mass or less, and particularly preferably 10 parts by mass or less. If the content ratio of the component (A) exceeds the above range, the resulting formed article may exhibit improved impact resistance, but tends to exhibit decreased flexural strength.

The lower limit of the content ratio of the component (B) in the composition according to one embodiment of the invention is preferably 3 parts by mass or more, more preferably 10 parts by mass or more, and particularly preferably 30 parts by mass or more, based on 100 parts by mass of the component (C). If the lower limit of the content ratio of the component (B) is less than the above range, the mechanical properties (e.g., impact resistance and flexural strength) of the resulting formed article may not be improved. The upper limit of the content ratio of the component (B) is preferably 150 parts by mass or less, more preferably 140 parts by mass or less, still more preferably 130 parts by mass or less, and particularly preferably 100 parts by mass or less. If the content ratio of the component (B) exceeds the above range, the resulting formed article may exhibit decreased falling weight impact strength, and a strand tends to fuzz during extrusion.

1.6. Method for Producing Composition

The composition according to one embodiment of the invention may be produced by mixing the component (A), the component (B), the component (C), and an optional additional component. The mixing method is not particularly limited as long as the component (B) is uniformly dispersed in the composition. The composition according to one embodiment of the invention may be produced by mixing (kneading) the component (A), the component (B), the component (C) at one time, or may be produced by mixing the component (A) and the component (C) to prepare a composition (masterbatch), and mixing the composition (masterbatch) with the component (B). Alternatively, the component (A) may be applied to the component (B) as a sizing agent, and the component (B) to which the component (A) has been applied may be mixed with the component (C).

1.6.1. When Component (A) is Used as Sizing Agent

When the component (A) is used as a sizing agent, the polymer solution that includes the conjugated diene-based polymer produced using the method for producing the component (A) described above may be used directly as the sizing agent. The component (A) may be separated from the polymer solution, dissolved in a solvent, and used in the form of a solution. Alternatively, the component (A) may be separated from the polymer solution, dispersed in a dispersion medium, and used in the form of an emulsion (latex). When the component (A) is applied to the surface of the component (B) in advance as a sizing agent, the composition according to one embodiment of the invention has a configuration in which the component (A) is unevenly distributed at the interface between the component (B) and the component (C). In this case, it is possible to effectively improve the adhesion between the component (B) and the component (C) even when the component (A) is used in a small amount. This makes it possible to significantly improve the mechanical strength of the resulting formed article.

When the component (A) is dissolved in a liquid medium, and the resulting solution is applied to the component (B) as a sizing agent, the liquid medium is not particularly limited. Examples of the liquid medium include a hydrocarbon-based liquid medium such as an aromatic hydrocarbon such as benzene, toluene, and xylene; an alicyclic hydrocarbon such as cyclopentane, cyclopentene, and cyclohexane; an aliphatic hydrocarbon such as pentane, hexane, and heptane; an alcohol such as methanol, ethanol, propanol, 2-propanol, ethylene glycol, and glycerol; and a halogenated hydrocarbon such as methylene chloride, chloroform, and ethylene dichloride. Among these, an aromatic hydrocarbon, an alicyclic hydrocarbon, and an aliphatic hydrocarbon are preferable, and an aliphatic hydrocarbon is more preferable. The liquid medium is preferably included in the composition according to one embodiment of the invention in a ratio of 100 to 10,000 parts by mass, more preferably 300 to 5,000 parts by mass, and particularly preferably 600 to 3,000 parts by mass, based on 100 parts by mass of the component (A).

When an emulsion prepared by dispersing the component (A) in a liquid medium is applied to the component (B) as a sizing agent, the sizing agent may be prepared using a known emulsification method.

Emulsification may be effected optionally using a surfactant. Examples of the surfactant include a nonionic surfactant such as a polyoxyethylene alkyl ether, a polyoxyethylene alkylphenol ether, a polyoxyethylene alkyl ester, and a polyoxyethylene sorbitan alkyl ester; an alkali metal salt and an alkaline-earth metal salt of a fatty acid such as myristic acid, palmitic acid, oleic acid, linolenic acid, stearic acid, lauric acid, alginic acid, and ricinoleic acid; an alkali metal salt and an alkaline-earth metal salt of a resin acid such as rosin acid, disproportionated rosin acid, and hydrogenated rosin acid; an amine salt of a hydroxyamine of a long-chain fatty acid ester that includes a linear alkyl group or a cycloalkyl group; an anionic surfactant such as an alkylbenzenesulfonate such as sodium dodecylbenzenesulfonate, a higher alcohol sulfuric acid ester salt, and an alkylsulfosuccinic acid salt; a cationic surfactant such as an alkyltrimethylammonium chloride, a dialkylammonium chloride, benzylammonium chloride, and tridecylbenzenehydroxyethylimidazole chloride; a phosphoric ester of a higher alcohol such as capryl alcohol and octyl alcohol; and a monoester of oleic acid and pentaerythritol such as sorbitan monooleate. It is also possible to use a copolymerizable surfactant such as a sulfo ester of an alpha,beta-unsaturated carboxylic acid, a sulfate ester of an alpha,beta-unsaturated carboxylic acid, and a sulfoalkyl aryl ether. Water may suitably be used as the liquid medium.

The surfactant is preferably used in a ratio of 0.5 to 50 parts by mass, and more preferably 0.5 to 20 parts by mass, based on 100 parts by mass of the component (A). When the surfactant is used in a ratio within the above range, the stability of the emulsion tends to be further improved.

The average particle size of the component (A) included in the emulsion is preferably 0.02 to 100 micrometers, more preferably 0.1 to 10 micrometers, and particularly preferably 0.5 to 5 micrometers. When the average particle size of the component (A) included in the emulsion is within the above range, the viscosity of the emulsion can be controlled within a range that facilitates handling, and it is possible to reduce the formation of a film at the gas-liquid interface when the emulsion is stored. The average particle size of the component (A) included in the emulsion may be measured using a particle size distribution analyzer that utilizes a laser diffraction-scattering method as a measurement principle. Examples of such a particle size distribution analyzer include Microtrac MT3000 (manufactured by Nikkiso Co., Ltd.).

The liquid medium is preferably included in the emulsion in a ratio of 100 to 10,000 parts by mass, more preferably 300 to 5,000 parts by mass, and particularly preferably 600 to 3,000 parts by mass, based on 100 parts by mass of the component (A).

An additive (e.g., pH-adjusting agent, defoamer, preservative, cross-linking agent, chelating agent, oxygen scavenger, and dispersant) that is normally used in the field of a latex may be added to the sizing agent for fibers. Examples of the pH-adjusting agent include an alkali metal hydroxide such as sodium hydroxide and potassium hydroxide; an alkali metal carbonate such as sodium carbonate and potassium carbonate; an alkali metal hydrogen carbonate such as sodium hydrogen carbonate; carbon dioxide; ammonia; and an organic amine compound such as trimethylammonium and triethanolamine. It is preferable to use an alkali metal hydroxide, carbon dioxide, or ammonia.

When the component (A) is applied to the component (B) as a sizing agent, and the component (B) is mixed with the component (C), the component (A) may be applied to the component (B) using an arbitrary method. For example, a spray method, a roller immersion method, a roller transfer method, a guide supply method, or the like may be used. The component (B) may be used in the form of single fibers or a fiber bundle. The component (B) is preferably used in the form of a fiber bundle. After applying the component (A) to the component (B), the component (B) may be heated using a hot air blower, a heating plate, a roller, an infrared heater, or the like.

1.6.2. Composition Production Conditions

The composition according to one embodiment of the invention may be produced by mixing the component (A), the component (B), the component (C), an optional additional component, and the like using a method for producing a short fiber-reinforced resin, the method for producing a long fiber-reinforced resin disclosed in JP-A-2014-151458, Japanese Patent No. 4354776, or the like, the method for producing a continuous fiber-reinforced resin disclosed in JP-A-2014-234509, WO2014/038574, or the like, or the LFT-D production method disclosed in In-line compounding and molding of long-fiber reinforced thermoplastics (D-LFT): Insight into a rapid growing technology. ANTEC2004 Conference Proceedings p. 3500. The mixing temperature is preferably 150 to 350° C., and the shear rate is preferably 100 to 20,000 $s^{-1}$. The specific energy calculated by dividing the power consumption of a motor of a mixer per unit time by the mixing amount per unit time is preferably 0.1 to 10 kWh/kg.

The components may be mixed using a known mixer (e.g., single-screw extruder, twin-screw extruder, Banbury mixer, kneader, and roll), or a combination thereof. The components may be mixed at one time, or some of the components may be mixed in advance, and the remaining components may then be added and mixed (multi-step mixing method).

It is particularly preferable to produce the composition according to one embodiment of the invention using a twin-screw extruder. A co-rotating twin-screw extruder or a counter-rotating twin-screw extruder may suitably be used as the twin-screw extruder. For example, a twin-screw extruder and a twin-screw extruder may be used in a connected state, or a twin-screw extruder and a single-screw extruder may be used in a connected state, or a continuous mixer and a twin-screw extruder may be used in a connected state.

When an extruder is used as the mixer, the ratio "L/D" (i.e., the ratio of the effective length (L) to the diameter (D) of the screw of the extruder) is preferably 30 to 80. A general-purpose kneading disc segment, a rotor segment, a Various Clearance Mixing Technology (VCMT) rotor segment, a twist kneading segment, a backward mixing single flight screw (BMS) segment, or the like may be used as the mixing segment.

The resulting mixture may be supplied to a single-screw extruder or a twin-screw extruder, and melt-mixed under the same mixing conditions as those described above. For example, the component (A), the component (B), the component (C), and an optional additional component may be melt-mixed using the above mixer under the above mixing conditions, and the above step may optionally be repeated a plurality of times.

The raw material components may be preliminarily mixed using a Henschel mixer or the like before melt-mixing the components. The raw material components or the mixture may optionally be dried using a dehumidification dryer, a hot-air dryer, or the like before or after melt-mixing the components. In this case, the drying temperature is preferably 50° C. or more, and the drying time is preferably 2 hours or more.

The composition according to one embodiment of the invention thus produced may be pelletized to produce a formed article. For example, the composition according to one embodiment of the invention may be formed to have a columnar shape, and cut to have a size appropriate for producing the formed article described later to produce pellets. A mixture including the component (A) and the component (C) that has been prepared in advance may be fed from an extruder to a crosshead die in a molten state while drawing carbon fibers through the crosshead die to impregnate the carbon fibers with the mixture, and the carbon fibers impregnated with the mixture may be heated, cooled, and cut in the direction that perpendicularly intersects the drawing direction to produce pellets. In this case, the carbon fibers are arranged in parallel along the length of the pellets so as to have the same length as that of the pellets.

When pellets are produced by drawing, a continuous reinforcing fiber bundle is basically drawn and impregnated with a resin. In this case, it is possible to use a method that feeds a resin from an extruder or the like to a crosshead die while passing a fiber bundle through the crosshead die to implement impregnation, a method that passes a fiber bundle through an impregnation bath filled with a resin emulsion, suspension, or solution to implement impregnation, a method that sprays a resin powder to a fiber bundle, or passes a fiber bundle through a tank filled with a resin powder, so that the resin powder adheres to the fibers, and melts the resin to implement impregnation, or the like.

The impregnation operation is preferably performed at 180 to 300° C., more preferably 200 to 280° C., and particularly preferably 220 to 260° C., or the impregnated product is preferably heated at 180 to 300° C., more preferably 200 to 280° C., and particularly preferably 220 to 260° C. If the heating temperature is lower than the above range, impregnation may be insufficient. If the heating temperature is higher than the above range, the resin (C) may be decomposed. When impregnation is effected at a temperature within the above range, the reaction between the conjugated diene-based polymer (A) and the fibers (B) also occurs, and an improvement in strength is achieved.

The melt-impregnated product is heated, and extruded to produce a strand, which is cooled to a temperature that allows cutting, and cut using a cutter to produce pellets. The shape of the pellets is not particularly limited. The pellets may have a columnar shape, a prism-like shape, a plate-like shape, a dice-like shape, or the like. The pellets thus obtained have a configuration in which the carbon fibers have a substantially identical length, and arranged in the direction in which the carbon fibers have been extruded (i.e., the direction along the length of the pellets).

The pellets may be a mixture that includes two or more carbon fibers that differ in type or concentration, or includes two or more acid group-containing olefin-based resins that differ in type. Note that the term "pellets" used herein includes pellets in a narrow sense (see above), and pellets in a broad sense, such as strand-like pellets, sheet-like pellets, and tabular pellets.

When the composition according to one embodiment of the invention is used as a long fiber-reinforced resin, the length of the fibers (B) included in the pellets is preferably 4 to 50 mm, more preferably 5 to 40 mm, and particularly preferably 6 to 30 mm. When the composition according to one embodiment of the invention is used as a long fiber-reinforced resin, the mechanical properties desired for a composite material may not be obtained if the length of the fibers (B) included in the pellets is smaller than the above range. If the length of the fibers (B) included in the pellets is larger than the above range, it may be difficult to feed the pellets to an injection molding machine or the like.

2. Formed Article

The formed article according to one embodiment of the invention is obtained by forming the composition according to one embodiment of the invention (see above). The composition may be formed using a forming method that is normally employed for a thermoplastic composition. More specifically, the composition may be formed using an injection forming method, an extrusion method, a blow forming method, a foaming method, a pressing method, or the like. The component (B) may be formed to have the desired shape (e.g., sheet-like shape), and impregnated with a mixture including the component (A) and the component (C) that have been melted to produce a formed article.

The conjugated diene-based polymer (A), the fibers (B), and the thermoplastic resin (C) may be introduced into an extruder, the conjugated diene-based polymer (A) and the thermoplastic resin (C) may be mixed while cutting the fibers (B) by rotating the screw of the extruder to obtain a mixed material, and the mixed material may be extruded into a mold from the extruder, and pressed to produce a formed article.

Alternatively, the fibers (B) may be fed to the screw part of an injection molding machine in which the conjugated diene-based polymer (A) and the thermoplastic resin (C) have been mixed, and cut and dispersed therein, and the resulting mixture may be subjected to injection forming or extrusion.

A formed article that exhibits excellent mechanical strength can be produced by utilizing the composition according to one embodiment of the invention. It is also possible to reduce a situation in which the surface of the formed article fuzzes during extrusion.

The formed article according to one embodiment of the invention that has the above properties may suitably be used as an automotive material (e g, automotive interior material, skin, and bumper), a housing used for a home electrical product, a home appliance material, a packing material, a constructional material, a civil engineering material, a fishery material, other industrial materials, and the like. When carbon fibers are used as the fibers, it is possible to use the formed article as an electromagnetic absorption material by appropriately adjusting the degree of orientation of the carbon fibers within the resin.

3. Examples

The invention is further described below by way of examples. Note that the invention is not limited to the following examples. The unit "parts" used in connection with the examples and the comparative examples refers to "parts by mass", and the unit "%" used in connection with the examples and the comparative examples refers to "mass %" unless otherwise indicated. The properties of the composition were measured as described below.

3.1. Property Values of Polymer (1) Vinyl Bond Content and the Like

The vinyl bond content (1,2-bond content and 3,4-bond content) was calculated by infrared absorption spectrometry (Morello method). The unit of the vinyl bond content is "mol %". The total content of styrene units and p-methylstyrene units was calculated by infrared absorption spectrometry (Morello method) using a calibration curve. The unit of the styrene unit content is "mass %".

(2) Hydrogenation Rate

The hydrogenation rate was calculated from the $^1$H-NMR spectrum (solvent: carbon tetrachloride, 400 MHz).

(3) Weight Average Molecular Weight (Mw)

The weight average molecular weight (Mw) (polystyrene-equivalent weight average molecular weight) was determined by gel permeation chromatography (GPC) using a system "HLC-8120" manufactured by Tosoh Corporation.
Eluant: THF
Measurement temperature: 40° C.
Column: TSKgel GMHXL (4) Amino Group Content The amino group content used herein refers to the number of amino groups per molecular chain of the polymer, and is calculated by the following expression.

Amino group content=(number of amino groups/ molecular chain of polymer)

The amino group content was calculated using the following method. The amino group concentration (mol/g) was calculated by the amine titration method described in Analy. Chem. 564 (1952). Specifically, the resulting polymer was purified, and dissolved in an organic solvent, and $HClO_4$/ $CH_3COOH$ was titrated using methyl violet as an indicator until the color of the solution changed from purple to light blue to calculate the amino group concentration (mol/g). The amino group concentration (mol/g) was multiplied by the molecular weight (g/mol) to calculate the content (number) of amino groups per molecular chain of the polymer. Note that the molecular weight was calculated from the polystyrene-equivalent number average molecular weight determined by GPC.

3.2. Composition Property Measurement Methods and Evaluation Methods (1) Flexural Strength A specimen (width; 10 mm, length: 150 mm, thickness: 2 mm) was prepared using a specimen preparation device "IDT-3" manufactured by Toyo Baldwin. The test was performed in accordance with ISO 179 (distance between supports: 64 mm, testing speed: 2 mm/min). The test temperature was 23° C. The unit of the flexural strength is "MPa". It is preferable that the flexural strength be higher than the flexural strength (=100%) of the formed article that does not include the component (A). It was determined that the flexural strength was "Good" when the flexural strength of the formed article was 110% or more with respect to the flexural strength (=100%) of the formed article that did not include the component (A).

(2) Charpy Unnotched Impact Strength

A specimen (width; 10 mm, length: 150 mm, thickness: 2 mm) was prepared using a specimen preparation device "IDT-3" manufactured by Toyo Baldwin. The specimen was subjected to the test in accordance with ISO 178 in a state in which the specimen was not notched. A hammer having a weight of 4 J was used as a striking arm. The test temperature was 23° C. The unit of the Charpy unnotched impact strength is "$kJ/m^2$". It is preferable that the Charpy impact strength be higher than the Charpy impact strength (=100%) of the formed article that does not include the component (A). It was determined that the Charpy impact strength was "Good" when the Charpy impact strength of the formed article was 110% or more with respect to the Charpy impact strength (=100%) of the formed article that did not include the component (A).

(3) Falling Weight Impact Strength

A specimen (80×55×2.4 mm) was prepared using an injection molding machine "J35AD" manufactured by Japan Steel Works, Ltd. The specimen was placed in a high-speed impact tester "HITS-P10" manufactured by Shimadzu Corporation, and subjected to a falling weight test (weight punch end diameter: 12.7 mm, receiver hole diameter: 43 mm, testing speed: 6.7 m/s, test temperature: 23° C.) to measure the puncture energy in accordance with JIS K 7211-2. The unit of the falling weight impact strength is "J". It is preferable that the falling weight impact strength be higher than the falling weight impact strength (=100%) of the formed article that does not include the component (A). It was determined that the falling weight impact strength was "Good" when the falling weight impact strength of the formed article was 150% or more with respect to the falling weight impact strength (=100%) of the formed article that did not include the component (A).

(4) Fuzz (Strand)

The raw materials were melt-mixed using a single-screw extruder "FS40" manufactured by Ikegai Corp. Fuzz was evaluated in accordance with the following standard based on the external appearance of the strand observed with the naked eye, and clogging when the strand was introduced into a pelletizer.

3 points (Good): The fibrous filler was not observed outside the strand, and no clogging occurred when the strand was introduced into the pelletizer.

2 points (Fair): Some fibrous filler was observed outside the strand, and some clogging occurred when the strand was introduced into the pelletizer.

1 point (Bad): The fibrous filler was observed outside the strand, and clogging occurred when the strand was introduced into the pelletizer (i.e., it was difficult to implement pelletization).

3.3. Production of Hydrogenation Catalyst

A hydrogenation catalyst was produced as described below.

A 1 L three-necked flask equipped with a stirrer and a dropping funnel in which the internal atmosphere had been replaced by dry nitrogen, was charged with 200 mL of anhydrous tetrahydrofuran and 0.2 mol of tetrahydrofurfuryl alcohol. After the dropwise addition of a solution (0.2 mol) of n-butyllithium (n-BuLi) in cyclohexane to the three-necked flask at 15° C., the mixture was reacted to obtain a solution of tetrahydrofurfuryloxylithium in tetrahydrofuran.

A 1 L three-necked flask equipped with a stirrer and a dropping funnel in which the internal atmosphere had been replaced by dry nitrogen, was charged with 49.8 g (0.2 mol) of bis(eta5-cyclopentadienyl)titanium dichloride and 250 mL of anhydrous tetrahydrofuran. The solution of tetrahydrofurfuryloxylithium in tetrahydrofuran obtained as described above was added dropwise to the mixture at room temperature over about 1 hour with stirring. When about 2 hours had elapsed, the resulting reddish brown liquid was filtered, and the insoluble part was washed with dichloromethane.

After combining the filtrate and the liquid obtained by washing, the solvent was removed under reduced pressure to obtain a hydrogenation catalyst (bis(eta5-cyclopentadienyl) titanium (tetrahydrofurfuryloxy)chloride (also referred to as "chlorobis(2,4-cyclopentadienyl)titanium(IV) tetrahydrofurfuryl alkoxide")). The yield was 95%.

3.4. Synthesis of Conjugated Diene-Based Polymer (A)

<Synthesis Example 1>

A reaction vessel (internal volume: 50 L) in which the internal atmosphere had been replaced by nitrogen, was charged with cyclohexane (25 kg), tetrahydrofuran (750 g), 1,3-butadiene (5,000 g), and n-butyllithium (83.3 g), and the mixture was subjected to adiabatic polymerization from 20° C. After completion of the reaction, N,N-bis(trimethylsilyl) aminopropylmethyldiethoxysilane (314 g) was added to the reaction vessel, and the mixture was reacted for 30 minutes. After the addition of water and the polymer solution obtained as described above to a solvent removal tank so that the ratio of water was 200 parts by mass based on 100 parts by mass of the polymer solution, the solvent was removed by steam stripping (steam temperature: 190° C.) for 2 hours in a state in which the temperature of the liquid phase contained in the solvent removal tank was 95° C., and the residue was dried using a heated roll that was controlled at 110° C. to obtain a conjugated diene-based polymer (1-A) (i.e., modified conjugated diene polymer).

<Synthesis Example 22

Adiabatic polymerization was effected in the same manner as in Synthesis Example 1, except that 32.8 g of n-butyllithium was used. After completion of the reaction, N,N-bis(trimethylsilyl)aminopropylmethyldiethoxysilane (101 g) was added to the reaction vessel, and the mixture was reacted for 30 minutes. After the addition of the hydrogenation catalyst (7.1 g), diethylaluminum chloride (54.3 g), and n-butyllithium (0.5 g), the mixture was reacted for 1 hour under a hydrogen pressure of 1.0 MPa. After completion of the reaction, the reaction mixture was cooled to 70° C. (pressure: normal pressure), and removed from the reaction vessel to obtain a polymer solution. A solvent removal operation and a drying operation were performed in the same manner as in Synthesis Example 1 to obtain a conjugated diene-based polymer (2-B) (i.e., modified hydrogenated conjugated diene polymer).

<Synthesis Example 3>

Adiabatic polymerization was effected in the same manner as in Synthesis Example 1. After completion of the reaction, N,N-bis(trimethylsilyl)aminopropylmethyldiethoxysilane (314 g) was added to the reaction vessel, and the mixture was reacted for 30 minutes. After the addition of silicon tetrachloride (42.1 g), the hydrogenation catalyst (7.1 g) and diethylaluminum chloride (169.5 g) were added to the mixture when 15 minutes had elapsed from the addition of silicon tetrachloride, and the mixture was reacted for 1 hour under a hydrogen pressure of 1.0 MPa. After completion of the reaction, the reaction mixture was cooled to 70° C. (pressure: normal pressure), and removed from the reaction vessel to obtain a polymer solution. A solvent removal operation and a drying operation were performed in the same manner as in Synthesis Example 1 to obtain a conjugated diene-based polymer (3-B) (i.e., modified hydrogenated conjugated diene polymer).

<Synthesis Example 4>

A reaction vessel (internal volume: 50 L) in which the internal atmosphere had been replaced by nitrogen, was charged with cyclohexane (25 kg), tetrahydrofuran (750 g), p-methylstyrene (1,250 g), 1,3-butadiene (3,750 g), and n-butyllithium (7.0 g), and the mixture was subjected to adiabatic polymerization from 20° C. A solvent removal operation and a drying operation were performed in the same manner as in Synthesis Example 1 to obtain a conjugated diene-based polymer (4-A) (i.e., conjugated diene copolymer). A 7 L separable flask equipped with a stirrer in which the internal atmosphere had been replaced by dry nitrogen, was charged with the conjugated diene copolymer (4-A) (500 g) and cyclohexane (4,000 g) to prepare a solution. After the addition of N,N,N',N'-tetramethylethylenediamine (13.8 g) and s-butyllithium (7.6 g), the mixture was stirred for 15 minutes. After the addition of N,N-bis (trimethylsilyl)aminopropylmethyldiethoxysilane (39.9 g), the mixture was reacted for 30 minutes. After evaporating the solvent using a rotary evaporator, the residue was dried at 60° C. for 18 hours under vacuum to obtain a conjugated diene-based polymer (4-C) (i.e., modified conjugated diene block copolymer).

<Synthesis Example 5>

A reaction vessel (internal volume: 50 L) in which the internal atmosphere had been replaced by nitrogen, was charged with cyclohexane (25 kg), tetrahydrofuran (750 g), p-methylstyrene (1,250 g), and n-butyllithium (7.0 g), and the mixture was subjected to adiabatic polymerization from 50° C. After completion of the reaction, the temperature was adjusted to 20° C. After the addition of 1,3-butadiene (3,750 g), the mixture was subjected to adiabatic polymerization. A solvent removal operation and a drying operation were performed in the same manner as in Synthesis Example 1 to obtain a conjugated diene-based polymer (5-A) (i.e., conjugated diene block copolymer). The subsequent operation was performed in the same manner as in Synthesis Example 4, except that the conjugated diene-based polymer (5-A) was used instead of the conjugated diene-based polymer (4-A), to obtain a conjugated diene-based polymer (5-C) (i.e., modified conjugated diene block copolymer).

<Synthesis Example 6>

Adiabatic polymerization was effected in the same manner as in Synthesis Example 5, except that the amount of p-methylstyrene was changed to 750 g. When 30 minutes had elapsed from the initiation of adiabatic polymerization, p-methylstyrene (500 g) was added to the mixture, and the resulting mixture was reacted (polymerized) for 30 minutes. A solvent removal operation and a drying operation were performed in the same manner as in Synthesis Example 1 to obtain a conjugated diene-based polymer (6-A) (i.e., conjugated diene block copolymer). The subsequent operation was performed in the same manner as in Synthesis Example 4, except that the conjugated diene-based polymer (6-A) was used instead of the conjugated diene-based polymer (4-A), to obtain a modified conjugated diene block copolymer (6-C).

<Synthesis Examples 7 to 11>

Conjugated diene-based polymers (7-A) to (11-A) and conjugated diene-based polymers (7-C) to (11-C) were obtained in the same manner as in Synthesis Example 6, except that the components listed in Table 1 were used in the amounts listed in Table 1.

<Synthesis Example 12>

Adiabatic polymerization was effected in the same manner as in Synthesis Example 6. When 30 minutes had elapsed from the initiation of adiabatic polymerization, styrene (500 g) was added to the mixture, and the resulting mixture was reacted (polymerized) for 30 minutes. A solvent removal operation and a drying operation were performed in the same manner as in Synthesis Example 1 to obtain a conjugated diene-based polymer (12-A) (i.e., conjugated diene block copolymer). The subsequent operation was performed in the same manner as in Synthesis Example 4, except that the conjugated diene-based polymer (12-A) was used instead of the conjugated diene-based polymer (4-A), to obtain a conjugated diene-based polymer (12-C) (i.e., modified conjugated diene block copolymer).

<Synthesis Example 13>

A reaction vessel (internal volume: 50 L) in which the internal atmosphere had been replaced by nitrogen, was charged with cyclohexane (25 kg), tetrahydrofuran (750 g), styrene (750 g), and n-butyllithium (6.9 g), and the mixture was subjected to adiabatic polymerization from 50° C. After completion of the reaction, the temperature was adjusted to 20° C. After the addition of p-methylstyrene (150 g) and 1,3-butadiene (3,600 g), the mixture was subjected to adiabatic polymerization. When 30 minutes had elapsed from the initiation of adiabatic polymerization, styrene (500 g) was added to the mixture, and the resulting mixture was reacted (polymerized) for 30 minutes. A solvent removal operation and a drying operation were performed in the same manner as in Synthesis Example 1 to obtain a conjugated diene-based polymer (13-A) (i.e., conjugated diene block copolymer). The subsequent operation was performed in the same manner as in Synthesis Example 4, except that the conjugated diene-based polymer (13-A) was used instead of the conjugated diene-based polymer (4-A), and the components listed in Table 1 were used in the amounts listed in Table 1, to obtain a conjugated diene-based polymer (13-C) (i.e., modified conjugated diene block copolymer).

<Synthesis Example 14>

A reaction vessel (internal volume: 50 L) in which the internal atmosphere had been replaced by nitrogen, was charged with cyclohexane (25 kg), tetrahydrofuran (750 g), styrene (750 g), and n-butyllithium (7.0 g), and the mixture was subjected to adiabatic polymerization from 50° C. After completion of the reaction, the temperature was adjusted to 20° C. After the addition of 1,3-butadiene (3,650 g), the mixture was subjected to adiabatic polymerization. When 30 minutes had elapsed from the initiation of adiabatic polymerization, styrene (500 g) was added to the mixture, and 1,3-butadiene (100 g) was added to the mixture when a further 15 minutes had elapsed. The resulting mixture was subjected to polymerization. After the addition of N,N-bis(trimethylsilyl)aminopropylmethyldiethoxysilane (21.6 g), the mixture was reacted for 30 minutes. A solvent removal operation and a drying operation were performed in the same manner as in Synthesis Example 1 to obtain a conjugated diene-based polymer (14-A) (i.e., modified conjugated diene block copolymer).

<Synthesis Example 15>

A conjugated diene-based polymer (15-A) was obtained in the same manner as in Synthesis Example 14, except that the components listed in Table 1 were used in the amounts listed in Table 1.

<Synthesis Example 16>

Adiabatic polymerization was effected in the same manner as in Synthesis Example 14, except that the amount of n-butyllithium was changed to 28.1 g. When 30 minutes had elapsed from the initiation of adiabatic polymerization, styrene (500 g) was added to the mixture, and 1,3-butadiene (100 g) was added to the mixture when a further 15 minutes had elapsed. The resulting mixture was subjected to polymerization. After the addition of N,N-bis(trimethylsilyl)aminopropylmethyldiethoxysilane (86.2 g), the mixture was reacted for 30 minutes. After the addition of the hydrogenation catalyst (5.4 g), diethylaluminum chloride (46.5 g), and n-butyllithium (0.2 g), the mixture was reacted for 1 hour under a hydrogen pressure of 1.0 MPa. After completion of the reaction, the reaction mixture was cooled to 70° C. (pressure: normal pressure), and removed from the reaction vessel to obtain a polymer solution. A solvent removal operation and a drying operation were performed in the same manner as in Synthesis Example 1 to obtain a conjugated diene-based polymer (16-B) (i.e., modified hydrogenated conjugated diene block copolymer).

<Synthesis Examples 17 to 25>

Conjugated diene-based polymers (17-B) to (25-B) were obtained in the same manner as in Synthesis Example 16, except that the components listed in Table 2 were used in the amounts listed in Table 2.

<Synthesis Example 26>

A reaction vessel (internal volume: 50 L) in which the internal atmosphere had been replaced by nitrogen, was charged with cyclohexane (25 kg), tetrahydrofuran (1.3 g), 1,3-butadiene (500 g), and n-butyllithium (7.5 g), and the mixture was subjected to adiabatic polymerization from 70° C. After completion of the reaction, the temperature was adjusted to 20° C. After the addition of tetrahydrofuran (750 g) and 1,3-butadiene (3,650 g), the mixture was subjected to adiabatic polymerization. When 30 minutes had elapsed from the initiation of adiabatic polymerization, styrene (750 g) was added to the mixture, and 1,3-butadiene (100 g) was added to the mixture when a further 15 minutes had elapsed. The resulting mixture was subjected to polymerization. After the addition of N,N-bis(trimethylsilyl)aminopropylmethyldiethoxysilane (22.9 g), the mixture was reacted for 30 minutes. After the addition of the hydrogenation catalyst (6.1 g), diethylaluminum chloride (12.3 g), and n-butyllithium (1.8 g), the mixture was reacted for 1 hour under a hydrogen pressure of 1.0 MPa. After completion of the reaction, the reaction mixture was cooled to 70° C. (pressure: normal pressure), and removed from the reaction vessel to obtain a polymer solution. A solvent removal operation and a drying operation were performed in the same manner as in Synthesis Example 1 to obtain a conjugated diene-based polymer (26-B) (i.e., modified hydrogenated conjugated diene block copolymer).

<Synthesis Examples 27 to 29>

Conjugated diene-based polymers (27-B) to (29-B) were obtained in the same manner as in Synthesis Example 26, except that the components listed in Table 2 were used in the amounts listed in Table 2.

<Synthesis Example 30>

A reaction vessel (internal volume: 50 L) in which the internal atmosphere had been replaced by nitrogen, was charged with cyclohexane (25 kg), tetrahydrofuran (750 g), p-methylstyrene (750 g), and n-butyllithium (7.0 g), and the mixture was subjected to adiabatic polymerization from 50° C. After completion of the reaction, the temperature was adjusted to 20° C. After the addition of 1,3-butadiene (3,750 g), the mixture was subjected to adiabatic polymerization. When 30 minutes had elapsed from the initiation of adiabatic polymerization, p-methylstyrene (500 g) was added to the mixture, and the resulting mixture was subjected to polymerization. The mixture was reacted for 30 minutes under a hydrogen pressure of 1.0 MPa, and polymerization was terminated. After the addition of silicon tetrachloride (1.7 g), the hydrogenation catalyst (5.4 g) and diethylaluminum chloride (2.1 g) were added to the mixture when 15 minutes had elapsed from the addition of silicon tetrachloride, and the mixture was reacted for 1 hour under a hydrogen pressure of 1.0 MPa. After completion of the reaction, the reaction mixture was cooled to 70° C. (pressure: normal pressure), and removed from the reaction vessel to obtain a polymer solution. A solvent removal operation and a drying operation were performed in the same manner as in Synthesis Example 1 to obtain a conjugated diene-based polymer (30-B) (i.e., hydrogenated modified conjugated diene block copolymer). A 7 L separable flask equipped with a stirrer in which the internal atmosphere had been replaced by dry nitrogen, was charged with the conjugated diene-based polymer (copolymer) (30-B) (500 g) and cyclohexane (4,000 g) to prepare a solution. After the addition of N,N,N',N'-tetramethylethylenediamine (13.8 g) and s-butyllithium (7.6 g), the mixture was stirred for 15 minutes. After the addition of N,N-bis(trimethylsilyl) aminopropylmethyldiethoxysilane (39.9 g), the mixture was reacted for 30 minutes. After evaporating the solvent using a rotary evaporator, the residue was dried at 60° C. for 18 hours under vacuum to obtain a conjugated diene-based polymer (30-D) (i.e., modified hydrogenated conjugated diene block copolymer).

<Synthesis Examples 31 to 33>

Conjugated diene-based polymers (31-B) to (33-B) and conjugated diene-based polymers (31-D) to (33-D) were obtained in the same manner as in Synthesis Example 30, except that the components listed in Table 2 or 3 were used in the amounts listed in Table 2 or 3.

<Synthesis Example 34>

A reaction vessel (internal volume: 50 L) in which the internal atmosphere had been replaced by nitrogen, was charged with cyclohexane (25 kg), tetrahydrofuran (750 g), styrene (500 g), p-methylstyrene (250 g), and n-butyllithium (7.0 g), and the mixture was subjected to adiabatic polymerization from 50° C. After completion of the reaction, the temperature was adjusted to 20° C. After the addition of 1,3-butadiene (3,750 g), the mixture was subjected to adiabatic polymerization. When 30 minutes had elapsed from the initiation of adiabatic polymerization, styrene (335 g) and p-methylstyrene (165 g) were added to the mixture, and the resulting mixture was subjected to polymerization. The mixture was reacted for 30 minutes under a hydrogen pressure of 1.0 MPa, and polymerization was terminated. After the addition of silicon tetrachloride (1.7 g), the hydrogenation catalyst (5.4 g) and diethylaluminum chloride (2.1 g) were added to the mixture when 15 minutes had elapsed from the addition of silicon tetrachloride, and the mixture was reacted for 1 hour under a hydrogen pressure of 1.0 MPa. After completion of the reaction, the reaction mixture was cooled to 70° C. (pressure: normal pressure), and removed from the reaction vessel to obtain a polymer solution. A solvent removal operation and a drying operation were performed in the same manner as in Synthesis Example 1 to obtain a conjugated diene-based polymer (34-B) (i.e., hydrogenated modified conjugated diene block copolymer). A 7 L separable flask equipped with a stirrer in which the internal atmosphere had been replaced by dry nitrogen, was charged with the conjugated diene-based polymer (34-B) (500 g) and cyclohexane (4,000 g) to prepare a solution. After the addition of N,N,N',N'-tetramethylethylenediamine (13.8 g) and s-butyllithium (7.6 g), the mixture was stirred for 15 minutes. After the addition of N,N-bis(trimethylsilyl) aminopropylmethyldiethoxysilane (39.9 g), the mixture was reacted for 30 minutes. After evaporating the solvent using a rotary evaporator, the residue was dried at 60° C. for 18 hours under vacuum to obtain a conjugated diene-based polymer (34-D) (i.e., modified hydrogenated conjugated diene block copolymer).

<Synthesis Example 35>

Adiabatic polymerization was effected in the same manner as in Synthesis Example 30. When 30 minutes had elapsed from the initiation of adiabatic polymerization, styrene (500 g) was added to the mixture, and the resulting mixture was subjected to polymerization. The mixture was reacted for 30 minutes under a hydrogen pressure of 1.0 MPa, and polymerization was terminated. After the addition of silicon tetrachloride (1.7 g), the hydrogenation catalyst (5.4 g) and diethylaluminum chloride (2.1 g) were added to the mixture when 15 minutes had elapsed from the addition of silicon tetrachloride, and the mixture was reacted for 1 hour under a hydrogen pressure of 1.0 MPa. After completion of the reaction, the reaction mixture was cooled to 70° C. (pressure: normal pressure), and removed from the reaction vessel to obtain a polymer solution. A solvent removal operation and a drying operation were performed in the same manner as in Synthesis Example 1 to obtain a conjugated diene-based polymer (35-B) (i.e., hydrogenated modified conjugated diene block copolymer). A 7 L separable flask equipped with a stirrer in which the internal atmosphere had been replaced by dry nitrogen, was charged with the conjugated diene-based polymer (35-B) (500 g) and cyclohexane (4,000 g) to prepare a solution. After the addition of N,N,N',N'-tetramethylethylenediamine (13.8 g) and s-butyllithium (7.6 g), the mixture was stirred for 15 minutes. After the addition of N,N-bis(trimethylsilyl)aminopropylmethyldiethoxysilane (39.9 g), the mixture was reacted for 30 minutes. After evaporating the solvent using a rotary evaporator, the residue was dried at 60° C. for 18 hours under vacuum to obtain a conjugated diene-based polymer (35-D) (i.e., modified hydrogenated conjugated diene block copolymer).

<Synthesis Example 36>

A reaction vessel (internal volume: 50 L) in which the internal atmosphere had been replaced by nitrogen, was charged with cyclohexane (25 kg), tetrahydrofuran (1.3 g), 1,3-butadiene (500 g), and n-butyllithium (5.0 g), and the mixture was subjected to adiabatic polymerization from 70° C. After completion of the reaction, the temperature was adjusted to 20° C. After the addition of tetrahydrofuran (750 g) and 1,3-butadiene (3,750 g), the mixture was subjected to adiabatic polymerization. When 30 minutes had elapsed from the initiation of adiabatic polymerization, p-methylstyrene (750 g) was added to the mixture, and the resulting mixture was subjected to polymerization. The mixture was reacted for 30 minutes under a hydrogen pressure of 1.0 MPa, and polymerization was terminated. After the addition of silicon tetrachloride (0.7 g), the hydrogenation catalyst (6.1 g) and diethylaluminum chloride (2.4 g) were added to the mixture when 15 minutes had elapsed from the addition of silicon tetrachloride, and the mixture was reacted for 1 hour under a hydrogen pressure of 1.0 MPa. After completion of the reaction, the reaction mixture was cooled to 70° C. (pressure: normal pressure), and removed from the reaction vessel to obtain a polymer solution. A solvent removal operation and a drying operation were performed in the same manner as in Synthesis Example 1 to obtain a conjugated diene-based polymer (36-B) (i.e., modified hydrogenated conjugated diene block copolymer). A 7 L separable flask equipped with a stirrer in which the internal atmosphere had been replaced by dry nitrogen, was charged with the conjugated diene-based polymer (36-B) (500 g) and cyclohexane (4,000 g) to prepare a solution. After the addition of N,N,N',N'-tetramethylethylenediamine (14.7 g) and s-butyllithium (8.1 g), the mixture was stirred for 15 minutes. After the addition of N,N-bis(trimethylsilyl)aminopropylmethyldiethoxysilane (42.3 g), the mixture was reacted for 30 minutes. After evaporating the solvent using a rotary evaporator, the residue was dried at 60° C. for 18 hours under vacuum to obtain a conjugated diene-based polymer (36-D) (i.e., modified hydrogenated conjugated diene block copolymer).

<Synthesis Example 37>

A reaction vessel (internal volume: 50 L) in which the internal atmosphere had been replaced by nitrogen, was charged with cyclohexane (25 kg), tetrahydrofuran (750 g), 1,3-butadiene (5,000 g), and n-butyllithium (83.3 g), and the mixture was subjected to adiabatic polymerization from 20° C. A solvent removal operation and a drying operation were performed in the same manner as in Synthesis Example 1 to obtain a conjugated diene-based polymer (37-A).

<Synthesis Example 38>

Adiabatic polymerization was effected in the same manner as in Synthesis Example 37. The mixture was reacted for 30 minutes under a hydrogen pressure of 1.0 MPa, and polymerization was terminated. After the addition of silicon tetrachloride (42.5 g), the hydrogenation catalyst (7.1 g) and diethylaluminum chloride (2.8 g) were added to the mixture when 15 minutes had elapsed from the addition of silicon tetrachloride, and the mixture was reacted for 1 hour under a hydrogen pressure of 1.0 MPa. After completion of the reaction, the reaction mixture was cooled to 70° C. (pressure: normal pressure), and removed from the reaction vessel to obtain a polymer solution. A solvent removal operation and a drying operation were performed in the same manner as in Synthesis Example 1 to obtain a conjugated diene-based polymer (38-B) (i.e., hydrogenated conjugated diene polymer).

<Synthesis Example 39>

A reaction vessel (internal volume: 50 L) in which the internal atmosphere had been replaced by nitrogen, was charged with cyclohexane (25 kg), tetrahydrofuran (750 g), styrene (750 g), and n-butyllithium (7.0 g), and the mixture was subjected to adiabatic polymerization from 50° C. After completion of the reaction, the temperature was adjusted to 20° C. After the addition of 1,3-butadiene (3,750 g), the mixture was subjected to adiabatic polymerization. When 30 minutes had elapsed from the initiation of adiabatic polymerization, styrene (500 g) was added to the mixture, and the resulting mixture was reacted (polymerized) for 30 minutes. A solvent removal operation and a drying operation were performed in the same manner as in Synthesis Example 1 to obtain a conjugated diene-based polymer (39-A) (i.e., conjugated diene block copolymer).

<Synthesis Example 40>

A reaction vessel (internal volume: 50 L) in which the internal atmosphere had been replaced by nitrogen, was charged with cyclohexane (25 kg), tetrahydrofuran (750 g), styrene (750 g), piperidine (3.4 g), and n-butyllithium (7.0 g), and the mixture was subjected to adiabatic polymerization from 50° C. After completion of the reaction, the temperature was adjusted to 20° C. After the addition of 1,3-butadiene (3,750 g), the mixture was subjected to adiabatic polymerization. When 30 minutes had elapsed from the initiation of adiabatic polymerization, styrene (500 g) was added to the mixture, and the resulting mixture was reacted (polymerized) for 30 minutes. A solvent removal operation and a drying operation were performed in the same manner as in Synthesis Example 1 to obtain a conjugated diene-based polymer (40-A) (i.e., conjugated diene block copolymer).

<Synthesis Example 41>

Adiabatic polymerization was effected in the same manner as in Synthesis Example 39. When 30 minutes had elapsed from the initiation of adiabatic polymerization, styrene (500 g) was added to the mixture, and the resulting mixture was subjected to polymerization. The mixture was reacted for 30 minutes under a hydrogen pressure of 1.0 MPa, and polymerization was terminated. After the addition of silicon tetrachloride (1.7 g), the hydrogenation catalyst (5.4 g) and diethylaluminum chloride (2.1 g) were added to the mixture when 15 minutes had elapsed from the addition of silicon tetrachloride, and the mixture was reacted for 1 hour under a hydrogen pressure of 1.0 MPa. After completion of the reaction, the reaction mixture was cooled to 70° C. (pressure: normal pressure), and removed from the reaction vessel to obtain a polymer solution. A solvent removal operation and a drying operation were performed in the same manner as in Synthesis Example 1 to obtain a conjugated diene-based polymer (41-B) (i.e., hydrogenated modified conjugated diene block copolymer).

<Synthesis Example 42>

Adiabatic polymerization was effected in the same manner as in Synthesis Example 40. When 30 minutes had elapsed from the initiation of adiabatic polymerization, styrene (500 g) was added to the mixture, and the resulting mixture was subjected to polymerization. The mixture was reacted for 30 minutes under a hydrogen pressure of 1.0 MPa, and polymerization was terminated. After the addition of silicon tetrachloride (1.7 g), the hydrogenation catalyst (5.4 g) and diethylaluminum chloride (2.1 g) were added to the mixture when 15 minutes had elapsed from the addition of silicon tetrachloride, and the mixture was reacted for 1 hour under a hydrogen pressure of 1.0 MPa. After completion of the reaction, the reaction mixture was cooled to 70° C. (pressure: normal pressure), and removed from the reaction vessel to obtain a polymer solution. A solvent removal operation and a drying operation were performed in the same manner as in Synthesis Example 1 to obtain a conjugated diene-based polymer (42-B) (i.e., hydrogenated modified conjugated diene block copolymer).

<Synthesis Example 43>

A conjugated diene-based polymer (43-B) and a conjugated diene-based polymer (43-D) were obtained in the same manner as in Synthesis Example 30, except that the components listed in Table 3 were used in the amounts listed in Table 3.

The reagents used for the reaction for producing each copolymer, and the analysis results are listed in Tables 1 to 3.

TABLE 1

|  | Synthesis Example 1 | Synthesis Example 2 | Synthesis Example 3 | Synthesis Example 4 | Synthesis Example 5 | Synthesis Example 6 | Synthesis Example 7 | Synthesis Example 8 |
|---|---|---|---|---|---|---|---|---|
| Cyclohexane (g) | 25,000 | 25,000 | 25,000 | 25,000 | 25,000 | 25,000 | 25,000 | 25,000 |
| Tetrahydrofuran (that was added prior to initiation of polymerization) (g) | 750 | 750 | 750 | 750 | 750 | 750 | 750 | 750 |
| 1,3-Butadiene (first stage) (g) |  |  |  |  |  |  |  |  |
| Styrene (first stage) (g) |  |  |  |  |  |  |  |  |
| p-Methylstyrene (first stage) (g) |  |  |  | 1,250 | 1,250 | 750 | 750 | 750 |
| N-t-Butyldimethylsilylpiperazine (g) |  |  |  |  |  |  |  |  |
| Piperidine (g) |  |  |  |  |  |  |  |  |
| n-Butyllithium (g) | 83.3 | 32.8 | 83.3 | 7.0 | 7.0 | 7.0 | 14.1 | 46.9 |
| Tetrahydrofuran (added after completion of first-stage polymerization) (g) |  |  |  |  |  |  |  |  |
| 1,3-Butadiene (second stage) (g) | 5,000 | 5,000 | 5,000 | 3,750 | 3,750 | 3,750 | 3,750 | 3,750 |
| p-Methylstyrene (second stage) (g) |  |  |  |  |  |  |  |  |
| Styrene (third stage) (g) |  |  |  |  |  |  |  |  |
| p-Methylstyrene (third stage) (g) |  |  |  |  |  | 500 | 500 | 500 |
| 1,3-Butadiene (fourth stage) (g) |  |  |  |  |  |  |  |  |
| N,N-Bis(trimethylsilyl)aminopropyl-methyldiethoxysilane (g) | 314 | 101 | 314 |  |  |  |  |  |
| 3-(4-Trimethylsilyl-1-piperazino)propyltriethoxysilane (g) |  |  |  |  |  |  |  |  |
| Diethyldiethoxysilane (g) |  |  |  |  |  |  |  |  |
| Methyldichlorosilane (g) |  |  |  |  |  |  |  |  |
| Silicon tetrachloride (g) |  |  |  |  |  |  |  |  |
| (Hydrogenation reaction) |  |  |  |  |  |  |  |  |
| Silicon tetrachloride (g) |  |  | 42.1 |  |  |  |  |  |
| Hydrogenation catalyst (g) |  | 7.1 | 7.1 |  |  |  |  |  |
| Diethylaluminum chloride (g) |  | 54.3 | 169.5 |  |  |  |  |  |
| n-Butyllithium (g) |  | 0.5 | 0.0 |  |  |  |  |  |
| (Modification reaction) |  |  |  |  |  |  |  |  |
| Polymer (g) |  |  |  | 500 | 500 | 500 | 500 | 500 |
| Cyclohexane (g) |  |  |  | 4,000 | 4,000 | 4,000 | 4,000 | 4,000 |
| TMEDA (g) |  |  |  | 13.8 | 13.8 | 13.8 | 13.8 | 23.1 |
| s-Butyllithium (g) |  |  |  | 7.6 | 7.6 | 7.6 | 7.6 | 12.7 |
| N,N-Bis(trimethylsilyl)aminopropyl-methyldiethoxysilane (g) |  |  |  | 39.9 | 39.9 | 39.9 | 39.9 | 66.5 |
| 3-(4-Trimethylsilyl-1-piperazino)propyltriethoxysilane (g) |  |  |  |  |  |  |  |  |
| Diethyldiethoxysilane (g) |  |  |  |  |  |  |  |  |
| (Analysis results) |  |  |  |  |  |  |  |  |
| Polymer | 1-A | 2-B | 3-B | 4-C | 5-C | 6-C | 7-C | 8-C |
| Vinyl bond content (%) | 82 | 75 | 84 | 80 | 80 | 79 | 81 | 70 |
| Total content of styrene and p-methylstyrene (%) | — | — | — | 25 | 25 | 25 | 25 | 25 |
| Hydrogenation rate (%) | — | 97 | 96 | — | — | — | — | — |
| Weight average molecular weight (×10,000) | 0.7 | 2.7 | 0.9 | 8 | 7 | 7 | 5 | 1.5 |
| Amino group content (number of amino groups/chain) | 1 | 1 | 1 | 10 | 5 | 9 | 4 | 2 |

|  | Synthesis Example 9 | Synthesis Example 10 | Synthesis Example 11 | Synthesis Example 12 | Synthesis Example 13 | Synthesis Example 14 | Synthesis Example 15 | Synthesis Example 16 |
|---|---|---|---|---|---|---|---|---|
| Cyclohexane (g) | 25,000 | 25,000 | 25,000 | 25,000 | 25,000 | 25,000 | 25,000 | 25,000 |
| Tetrahydrofuran (that was added prior to initiation of polymerization) (g) | 750 | 750 | 750 | 750 | 750 | 750 | 750 | 750 |
| 1,3-Butadiene (first stage) (g) |  |  |  |  |  |  |  |  |
| Styrene (first stage) (g) |  |  |  |  | 750 | 750 | 750 | 750 |
| p-Methylstyrene (first stage) (g) | 750 | 750 | 1,500 | 750 |  |  |  |  |

TABLE 1-continued

| | | | | | | | | |
|---|---|---|---|---|---|---|---|---|
| N-t-Butyldimethylsilylpiperazine (g) | | | | | | | 10.0 | |
| Piperidine (g) | | | | | | | | |
| n-Butyllithium (g) | 7.0 | 7.0 | 6.2 | 7.0 | 6.9 | 7.0 | 7.0 | 28.1 |
| Tetrahydrofuran (added after completion of first-stage polymerization) (g) | | | | | | | | |
| 1,3-Butadiene (second stage) (g) | 3,750 | 3,750 | 2,500 | 3,750 | 3,600 | 3,650 | 3,650 | 3,650 |
| p-Methylstyrene (second stage) (g) | | | | | 150 | | | |
| Styrene (third stage) (g) | | | | 500 | 500 | 500 | 500 | 500 |
| p-Methylstyrene (third stage) (g) | 500 | 500 | 1,000 | | | | | |
| 1,3-Butadiene (fourth stage) (g) | | | | | | 100 | 100 | 100 |
| N,N-Bis(trimethylsilyl)aminopropyl-methyldiethoxysilane (g) | | | | | | 21.6 | 21.6 | 86.2 |
| 3-(4-Trimethylsilyl-1-piperazino)pro-pyltriethoxysilane (g) | | | | | | | | |
| Diethyldiethoxysilane (g) | | | | | | | | |
| Methyldichlorosilane (g) | | | | | | | | |
| Silicon tetrachloride (g) | | | | | | | | |
| (Hydrogenation reaction) | | | | | | | | |
| Silicon tetrachloride (g) | | | | | | | | |
| Hydrogenation catalyst (g) | | | | | | | | 5.4 |
| Diethylaluminum chloride (g) | | | | | | | | 46.5 |
| n-Butyllithium (g) | | | | | | | | 0.2 |
| (Modification reaction) | | | | | | | | |
| Polymer (g) | 500 | 500 | 500 | 500 | 500 | | | |
| Cyclohexane (g) | 4,000 | 4,000 | 4,000 | 4,000 | 4,000 | | | |
| TMEDA (g) | 6.9 | 27.7 | 12.1 | 13.8 | 13.6 | | | |
| s-Butyllithium (g) | 3.8 | 15.3 | 6.7 | 7.6 | 7.5 | | | |
| N,N-Bis(trimethylsilyl)aminopropyl-methyldiethoxysilane (g) | 20.0 | 79.9 | 34.9 | 39.9 | 39.3 | | | |
| 3-(4-Trimethylsilyl-1-piperazino)pro-propyltriethoxysilane (g) | | | | | | | | |
| Diethyldiethoxysilane (g) | | | | | | | | |
| (Analysis results) | | | | | | | | |
| Polymer | 9-C | 10-C | 11-C | 12-C | 13-C | 14-A | 15-A | 16-B |
| Vinyl bond content (%) | 82 | 83 | 70 | 81 | 80 | 82 | 82 | 76 |
| Total content of styrene and p-methylstyrene (%) | 25 | 25 | 50 | 25 | 28 | 25 | 25 | 25 |
| Hydrogenation rate (%) | — | — | — | — | — | — | — | 98 |
| Weight average molecular weight (×10,000) | 8 | 8 | 9 | 8 | 8 | 8.6 | 10 | 2.7 |
| Amino group content (number of amino groups/chain) | 6 | 16 | 6 | 6 | 3 | 1 | 2 | 1 |

TABLE 2

| | Synthesis Example 17 | Synthesis Example 18 | Synthesis Example 19 | Synthesis Example 20 | Synthesis Example 21 | Synthesis Example 22 | Synthesis Example 23 | Synthesis Example 24 |
|---|---|---|---|---|---|---|---|---|
| Cyclohexane (g) | 25,000 | 25,000 | 25,000 | 25,000 | 25,000 | 25,000 | 25,000 | 25,000 |
| Tetrahydrofuran (that was added prior to initiation of polymerization) (g) | 750 | 750 | 750 | 750 | 250 | 125 | 750 | 750 |
| 1,3-Butadiene (first stage) (g) | | | | | | | | |
| Styrene (first stage) (g) | 750 | 750 | 1,500 | 450 | 750 | 750 | 750 | 750 |
| p-Methylstyrene (first stage) (g) | | | | | | | | |
| N-t-Butyldimethylsilylpiperazine (g) | | | | | | | 10.0 | |
| Piperidine (g) | | | | | | | | |
| n-Butyllithium (g) | 7.0 | 2.3 | 6.2 | 7.5 | 7.0 | 7.0 | 7.0 | 7.0 |
| Tetrahydrofuran (added after completion of first-stage polymerization) (g) | | | | | | | | |
| 1,3-Butadiene (second stage) (g) | 3,650 | 3,650 | 2,400 | 4,150 | 3,650 | 3,650 | 3,650 | 3,650 |
| p-Methylstyrene (second stage) (g) | | | | | | | | |
| Styrene (third stage) (g) | 500 | 500 | 1,000 | 300 | 500 | 500 | 500 | 500 |
| p-Methylstyrene (third stage) (g) | | | | | | | | |
| 1,3-Butadiene (fourth stage) (g) | 100 | 100 | 100 | 100 | 100 | 100 | 100 | 100 |
| N,N-Bis(trimethylsilyl)aminopropyl-methyldiethoxysilane (g) | 21.6 | 7.2 | 18.9 | 22.9 | 21.6 | 21.6 | 21.6 | |
| 3-(4-Trimethylsilyl-1-piperazino)pro-pyltriethoxysilane (g) | | | | | | | | 22.3 |
| Diethyldiethoxysilane (g) | | | | | | | | |
| Methyldichlorosilane (g) | | | | | | | | |
| Silicon tetrachloride (g) | | | | | | | | |

TABLE 2-continued

| | | | | | | | | |
|---|---|---|---|---|---|---|---|---|
| (Hydrogenation reaction) | | | | | | | | |
| Silicon tetrachloride (g) | | | | | | | | |
| Hydrogenation catalyst (g) | 5.4 | 5.4 | 3.6 | 6.1 | 5.4 | 5.4 | 5.4 | 5.4 |
| Diethylaluminum chloride (g) | 11.6 | 3.9 | 10.2 | 12.3 | 11.6 | 11.6 | 11.6 | 11.6 |
| n-Butyllithium (g) | 1.5 | 1.8 | 0.9 | 1.8 | 1.5 | 1.5 | 1.5 | 1.5 |
| (Modification reaction) | | | | | | | | |
| Polymer (g) | | | | | | | | |
| Cyclohexane (g) | | | | | | | | |
| TMEDA(g) | | | | | | | | |
| s-Butyllithium (g) | | | | | | | | |
| N,N-Bis(trimethylsilyl)aminopropyl-methyldiethoxysilane(g) | | | | | | | | |
| 3-(4-Trimethylsilyl-1-piperazino)propyltriethoxysilane(g) | | | | | | | | |
| Diethyldiethoxysilane (g) | | | | | | | | |
| (Analysis results) | | | | | | | | |
| Polymer | 17-B | 18-B | 19-B | 20-B | 21-B | 22-B | 23-B | 24-B |
| Vinyl bond content (%) | 80 | 78 | 76 | 78 | 65 | 50 | 78 | 82 |
| Total content of styrene and p-methylstyrene (%) | 25 | 25 | 50 | 15 | 25 | 25 | 25 | 25 |
| Hydrogenation rate (%) | 98 | 97 | 98 | 98 | 97 | 98 | 98 | 98 |
| Weight average molecular weight (×10,000) | 9.5 | 30 | 10 | 10 | 10 | 10 | 10 | 10 |
| Amino group content (number of amino groups/chain) | 1 | 1 | 1 | 1 | 1 | 1 | 1 | 1 |

| | Synthesis Example 25 | Synthesis Example 26 | Synthesis Example 27 | Synthesis Example 28 | Synthesis Example 29 | Synthesis Example 30 | Synthesis Example 31 | Synthesis Example 32 |
|---|---|---|---|---|---|---|---|---|
| Cyclohexane (g) | 25,000 | 25,000 | 25,000 | 25,000 | 25,000 | 25,000 | 25,000 | 25,000 |
| Tetrahydrofuran (that was added prior to initiation of polymerization) (g) | 750 | 1.3 | 1.3 | 1.3 | 1.3 | 750 | 750 | 750 |
| 1,3-Butadiene (first stage) (g) | | 500 | 500 | 500 | 1,500 | | | |
| Styrene (first stage) (g) | 750 | | | | | | | |
| p-Methylstyrene (first stage) (g) | | | | | | 750 | 750 | 750 |
| N-t-Butyldimethylsilylpiperazine (g) | 10.0 | | | | | | | |
| Piperidine (g) | | | | | | | | |
| n-Butyllithium (g) | 7.0 | 7.5 | 3.0 | 2.8 | 15.9 | 7.0 | 7.0 | 2.3 |
| Tetrahydrofuran (added after completion of first-stage polymerization) (g) | | 750 | 750 | 750 | 750 | | | |
| 1,3-Butadiene (second stage) (g) | 3,650 | 3,650 | 3,650 | 3,150 | 3,150 | 3,750 | 3,750 | 3,750 |
| p-Methylstyrene (second stage) (g) | | | | | | | | |
| Styrene (third stage) (g) | 500 | 750 | 750 | 1,250 | 250 | | | |
| p-Methylstyrene (third stage) (g) | | | | | | 500 | 500 | 500 |
| 1,3-Butadiene (fourth stage) (g) | 100 | 100 | 100 | 100 | 100 | | | |
| N,N-Bis(trimethylsilyl)aminopropyl-methyldiethoxysilane (g) | 21.6 | 22.9 | 9.1 | 8.6 | 48.7 | | | |
| 3-(4-Trimethylsilyl-1-piperazino)propyltriethoxysilane (g) | | | | | | | | |
| Diethyldiethoxysilane (g) | | | | | | | | |
| Methyldichlorosilane (g) | | | | | | | | |
| Silicon tetrachloride (g) | | | | | | | | |
| (Hydrogenation reaction) | | | | | | | | |
| Silicon tetrachloride (g) | | | | | | 1.7 | 1.7 | |
| Hydrogenation catalyst (g) | 5.4 | 6.1 | 6.1 | 5.4 | 6.8 | 5.4 | 5.4 | 5.4 |
| Diethylaluminum chloride (g) | 11.6 | 12.3 | 4.9 | 4.7 | 26.3 | 2.1 | 2.1 | 2.1 |
| n-Butyllithium (g) | 1.5 | 1.8 | 2.1 | 1.8 | 1.5 | | | 0.5 |
| (Modification reaction) | | | | | | | | |
| Polymer (g) | | | | | | 500 | 500 | 500 |
| Cyclohexane (g) | | | | | | 4,000 | 4,000 | 4,000 |
| TMEDA(g) | | | | | | 13.8 | 3.5 | 13.8 |
| s-Butyllithium (g) | | | | | | 7.6 | 1.9 | 7.6 |
| N,N-Bis(trimethylsilyl)aminopropyl-methyldiethoxysilane(g) | | | | | | 39.9 | 10.0 | 39.9 |
| 3-(4-Trimethylsilyl-1-piperazino)propyltriethoxysilane (g) | | | | | | | | |
| Diethyldiethoxysilane (g) | | | | | | | | |
| (Analysis results) | | | | | | | | |
| Polymer | 25-B | 26-B | 27-B | 28-B | 29-B | 30-D | 31-D | 32-D |
| Vinyl bond content (%) | 78 | 78 | 75 | 75 | 75 | 78 | 78 | 81 |
| Total content of styrene and p-methylstyrene (%) | 25 | 15 | 15 | 25 | 5 | 25 | 25 | 25 |

TABLE 2-continued

| | | | | | | | | |
|---|---|---|---|---|---|---|---|---|
| Hydrogenation rate (%) | 98 | 98 | 97 | 98 | 98 | 98 | 98 | 97 |
| Weight average molecular weight (×10,000) | 10 | 10 | 25 | 25 | 5 | 8.7 | 8.7 | 28 |
| Amino group content (number of amino groups/chain) | 2 | 1 | 1 | 1 | 1 | 10 | 2 | 8 |

TABLE 3

| | Synthesis Example 33 | Synthesis Example 34 | Synthesis Example 35 | Synthesis Example 36 | Synthesis Example 37 | Synthesis Example 38 |
|---|---|---|---|---|---|---|
| Cyclohexane (g) | 25,000 | 25,000 | 25,000 | 25,000 | 25,000 | 25,000 |
| Tetrahydrofuran (that was added prior to initiation of polymerization) (g) | 750 | 750 | 750 | 1.3 | 750 | 750 |
| 1,3-Butadiene (first stage) (g) | | | | 500 | 5,000 | 5,000 |
| Styrene (first stage) (g) | | 500 | | | | |
| p-Methylstyrene (first stage) (g) | 750 | 250 | 750 | | | |
| N-t-Butyldimethylsilylpiperazine (g) | | | | | | |
| Piperidine (g) | | | | | | |
| n-Butyllithium (g) | 7.0 | 7.0 | 7.0 | 5.0 | 83.3 | 83.3 |
| Tetrahydrofuran (added after completion of first-stage polymerization) (g) | | | | 750 | | |
| 1,3-Butadiene (second stage) (g) | 3,750 | 3,750 | 3,750 | 3,750 | | |
| p-Methylstyrene (second stage) (g) | | | | | | |
| Styrene (third stage) (g) | | 335 | 500 | | | |
| p-Methylstyrene (third stage) (g) | 500 | 165 | | 750 | | |
| 1,3-Butadiene (fourth stage) (g) | | | | | | |
| N,N-Bis(trimethylsilyl)aminopropyl-methyldiethoxysilane (g) | | | | | | |
| 3-(4-Trimethylsilyl-1-piperazino)propyltriethoxysilane (g) | | | | | | |
| Diethyldiethoxysilane (g) | | | | | | |
| Methyldichlorosilane (g) | | | | | | |
| Silicon tetrachloride (g) | | | | | | |
| (Hydrogenation reaction) | | | | | | |
| Silicon tetrachloride (g) | 1.7 | 1.7 | 1.7 | 0.7 | | 42.5 |
| Hydrogenation catalyst (g) | 5.4 | 5.4 | 5.4 | 6.1 | | 7.1 |
| Diethylaluminum chloride (g) | 2.1 | 2.1 | 2.1 | 2.4 | | 2.8 |
| n-Butyllithium (g) | | | | | | |
| (Modification reaction) | | | | | | |
| Polymer (g) | 500 | 500 | 500 | 500 | | |
| Cyclohexane (g) | 4,000 | 4,000 | 4,000 | 4,000 | | |
| TMEDA (g) | 13.8 | 13.8 | 13.8 | 14.7 | | |
| s-Butyllithium (g) | 7.6 | 7.6 | 7.6 | 8.1 | | |
| N,N-Bis(trimethylsilyl)aminopropyl-methyldiethoxysilane (g) | | 39.9 | 39.9 | 42.3 | | |
| N,N-Bis(trimethylsilyl)aminopropyl-dimethylmethoxysilane (g) | | | | | | |
| 3-(4-Trimethylsilyl-1-piperazino)propyltriethoxysilane (g) | 41.3 | | | | | |
| Diethyldiethoxysilane (g) | | | | | | |
| (Analysis results) | | | | | | |
| Polymer | 33-D | 34-D | 35-D | 36-D | 37-A | 38-B |
| Vinyl bond content (%) | 78 | 83 | 83 | 78 | 84 | 82 |
| Total content of styrene and p-methylstyrene (%) | 25 | 25 | 25 | 15 | 0 | 0 |
| Hydrogenation rate (%) | 98 | 98 | 97 | 98 | 98 | 98 |
| Weight average molecular weight (×10,000) | 8.7 | 9 | 8 | 14 | 0.7 | 0.8 |
| Amino group content (number of amino groups/chain) | 8 | 10 | 5 | 3 | — | — |

| | Synthesis Example 39 | Synthesis Example 40 | Synthesis Example 41 | Synthesis Example 42 | Synthesis Example 43 |
|---|---|---|---|---|---|
| Cyclohexane (g) | 25,000 | 25,000 | 25,000 | 25,000 | 25,000 |
| Tetrahydrofuran (that was added prior to initiation of polymerization) (g) | 750 | 750 | 750 | 750 | 750 |
| 1,3-Butadiene (first stage) (g) | | | | | |
| Styrene (first stage) (g) | 750 | 750 | 750 | 750 | |
| p-Methylstyrene (first stage) (g) | | | | | 750 |
| N-t-Butyldimethylsilylpiperazine (g) | | | | | |

TABLE 3-continued

| | | | | | |
|---|---|---|---|---|---|
| Piperidine (g) | | 3.4 | | 3.4 | |
| n-Butyllithium (g) | 7.0 | 7.0 | 7.0 | 7.0 | 7.0 |
| Tetrahydrofuran (added after completion of first-stage polymerization) (g) | | | | | |
| 1,3-Butadiene (second stage) (g) | 3,750 | 3,750 | 3,750 | 3,750 | 3,750 |
| p-Methylstyrene (second stage) (g) | | | | | |
| Styrene (third stage) (g) | 500 | 500 | 500 | 500 | |
| p-Methylstyrene (third stage) (g) | | | | | 500 |
| 1,3-Butadiene (fourth stage) (g) | | | | | |
| N,N-Bis(trimethylsilyl)aminopropyl-methyldiethoxysilane (g) | | | | | |
| 3-(4-Trimethylsilyl-1-piperazino)pro-pyltriethoxysilane (g) | | | | | |
| Diethyldiethoxysilane (g) | | | | | |
| Methyldichlorosilane (g) | | | | | |
| Silicon tetrachloride (g) | | | | | |
| (Hydrogenation reaction) | | | | | |
| Silicon tetrachloride (g) | | | 1.7 | 1.7 | 1.7 |
| Hydrogenation catalyst (g) | | | 5.4 | 5.4 | 5.4 |
| Diethylaluminum chloride (g) | | | 2.1 | 2.1 | 2.1 |
| n-Butyllithium (g) | | | | | |
| (Modification reaction) | | | | | |
| Polymer (g) | | | | | 500 |
| Cyclohexane (g) | | | | | 4,000 |
| TMEDA (g) | | | | | 13.8 |
| s-Butyllithium (g) | | | | | 7.6 |
| N,N-Bis(trimethylsilyl)aminopropyl-methyldiethoxysilane(g) | | | | | |
| N,N-Bis(trimethylsilyl)aminopropyl-dimethylmethoxysilane(g) | | | | | 34.7 |
| 3-(4-Trimethylsilyl-1-piperazino)pro-pyltriethoxysilane (g) | | | | | |
| Diethyldiethoxysilane (g) | | | | | |
| (Analysis results) | | | | | |
| Polymer | 39-A | 40-A | 41-B | 42-B | 43-D |
| Vinyl bond content (%) | 81 | 80 | 78 | 80 | 78 |
| Total content of styrene and p-methylstyrene (%) | 25 | 25 | 25 | 25 | 25 |
| Hydrogenation rate (%) | — | — | 98 | 98 | 98 |
| Weight average molecular weight (×10,000) | 9 | 9 | 10 | 9 | 9 |
| Amino group content (number of amino groups/chain) | — | 1 | — | 1 | 10 |

3.5. Examples 1 to 74 and Comparative Examples 1 to 37

0.1 parts by mass of pentaerythritol tetrakis[3-(3,5-di-tert-butyl-4-hydroxyphenyl)propionate] ("ADK STAB AO-60" manufactured by Adeka Corporation) (antioxidant), and 0.1 parts by mass of tris(2,4-di-tert-butylphenyl) phosphite ("ADK STAB 2112" manufactured by Adeka Corporation) (antioxidant) were added to the component (A), the component (B), and the component (C) listed in Tables 4 to 10, and the mixture was manually blended at room temperature. The mixture was melt-mixed using a single-screw extruder "FS40" manufactured by Ikegai Corp. to obtain pellets. When PP1, PP2, PP3, or PE was used as the thermoplastic resin (C), the cylinder temperature during melt-mixing was set so that the temperature around the base of the hopper was 140° C., and the temperature around the outlet was 200° C. (i.e., a temperature gradient was formed). When PA6 was used as the thermoplastic resin (C), the temperature around the base of the hopper was set to 170° C., and the temperature around the outlet was set to 240° C. When PA9T or PPS was used as the thermoplastic resin (C), the temperature around the base of the hopper was set to 260° C., and the temperature around the outlet was set to 320° C. After sufficiently drying the pellets, an alignment plate (width: 150 mm, length: 150 mm, thickness: 2 mm) was formed using an injection molding machine "IS-170FA" manufactured by Toshiba Machine Co., Ltd. A specimen (width: 15 mm, length: 150 mm, thickness: 2 mm) was cut from the resulting plate in the machine direction (MID) using a universal cutter, cut again using a specimen preparation device "IDT-3" manufactured by Toyo Baldwin (see below), and evaluated. When PP1, PP2, PP3, or PE was used as the thermoplastic resin (C), the cylinder temperature was set so that the temperature around the base of the hopper was 170° C., and the temperature around the nozzle was 200° C. (i.e., a temperature gradient was formed). When PA6 was used as the thermoplastic resin (C), the temperature around the base of the hopper was set to 170° C., and the temperature around the nozzle was set to 240° C. When PA9T or PPS was used as the thermoplastic resin (C), the temperature around the base of the hopper was set to 260° C., and the temperature around the nozzle was set to 320° C.

The composition of each example and comparative example, and the evaluation results are listed in Tables 4 to 11.

TABLE 4

|  |  | Example 1 | Example 2 | Example 3 | Example 4 | Example 5 | Example 6 | Example 7 | Example 8 |
|---|---|---|---|---|---|---|---|---|---|
| Conjugated diene-based polymer (A) | Type | 1-A | 2-A | 3-B | 4-C | 5-C | 6-C | 7-C | 8-C |
|  | (parts by mass) | 1 | 1 | 1 | 1 | 1 | 1 | 1 | 1 |
| Fibers (B) | Type | HT C702 | HT C702 | HT C702 | HT C702 | HT C702 | HT C702 | HT C702 | HT C702 |
|  | (parts by mass) | 20 | 20 | 20 | 20 | 20 | 20 | 20 | 20 |
| Thermoplastic resin (C) | Type | PP1 | PP1 | PP1 | PP1 | PP1 | PP1 | PP1 | PP1 |
|  | (parts by mass) | 100 | 100 | 100 | 100 | 100 | 100 | 100 | 100 |
| Absolute evaluation |  |  |  |  |  |  |  |  |  |
| Flexural strength (MPa) |  | 61 | 64 | 62 | 65 | 63 | 65 | 66 | 63 |
| Charpy unnotched impact strength (kJ/m$^2$) |  | 11 | 12 | 11 | 12 | 11 | 12 | 12 | 10 |
| Falling weight impact strength (J) |  | 3 | 3 | 3 | 3 | 3 | 3 | 3 | 3 |
| Fuzz (strand) (points) |  | 3 | 3 | 3 | 3 | 3 | 3 | 3 | 3 |
| Relative evaluation |  |  |  |  |  |  |  |  |  |
| Flexural strength (%) |  | 113 | 119 | 115 | 120 | 117 | 120 | 122 | 117 |
| Charpy unnotched impact strength (%) |  | 122 | 133 | 122 | 133 | 122 | 133 | 133 | 111 |
| Falling weight impact strength (%) |  | 150 | 150 | 150 | 150 | 150 | 150 | 150 | 150 |
| Relative comparison standard |  | Comparative Example 1 | Comparative Example 1 | Comparative Example 1 | Comparative Example 1 | Comparative Example 1 | Comparative Example 1 | Comparative Example 1 | Comparative Example 1 |

|  |  | Example 9 | Example 10 | Example 11 | Example 12 | Example 13 | Example 14 | Example 15 |
|---|---|---|---|---|---|---|---|---|
| Conjugated diene-based polymer (A) | Type | 9-C | 10-C | 11-C | 12-C | 13-C | 14-A | 15-A |
|  | (parts by mass) | 1 | 1 | 1 | 1 | 1 | 1 | 1 |
| Fibers (B) | Type | HT C702 | HT C702 | HT C702 | HT C702 | HT C702 | HT C702 | HT C702 |
|  | (parts by mass) | 20 | 20 | 20 | 20 | 20 | 20 | 20 |
| Thermoplastic resin (C) | Type | PP1 | PP1 | PP1 | PP1 | PP1 | PP1 | PP1 |
|  | (parts by mass) | 100 | 100 | 100 | 100 | 100 | 100 | 100 |
| Absolute evaluation |  |  |  |  |  |  |  |  |
| Flexural strength (MPa) |  | 64 | 67 | 64 | 65 | 64 | 66 | 68 |
| Charpy unnotched impact strength (kJ/m$^2$) |  | 11 | 13 | 12 | 12 | 11 | 12 | 12 |
| Falling weight impact strength (J) |  | 3 | 4 | 3 | 3 | 3 | 3 | 3 |
| Fuzz (strand) (points) |  | 3 | 3 | 3 | 3 | 3 | 3 | 3 |
| Relative evaluation |  |  |  |  |  |  |  |  |
| Flexural strength (%) |  | 119 | 124 | 119 | 120 | 119 | 122 | 126 |
| Charpy unnotched impact strength (%) |  | 122 | 144 | 133 | 133 | 122 | 133 | 133 |
| Falling weight impact strength (%) |  | 150 | 200 | 150 | 150 | 150 | 150 | 150 |
| Relative comparison standard |  | Comparative Example 1 | Comparative Example 1 | Comparative Example 1 | Comparative Example 1 | Comparative Example 1 | Comparative Example 1 | Comparative Example 1 |

TABLE 5

|  |  | Example 16 | Example 17 | Example 18 | Example 19 | Example 20 | Example 21 | Example 22 | Example 23 |
|---|---|---|---|---|---|---|---|---|---|
| Conjugated diene-based polymer (A) | Type | 16-B | 17-B | 18-B | 19-B | 20-B | 21-B | 22-B | 23-B |
|  | (parts by mass) | 1 | 1 | 1 | 1 | 1 | 1 | 1 | 1 |
| Fibers (B) | Type | HT C702 | HT C702 | HT C702 | HT C702 | HT C702 | HT C702 | HT C702 | HT C702 |
|  | (parts by mass) | 20 | 20 | 20 | 20 | 20 | 20 | 20 | 20 |
| Thermoplastic resin (C) | Type | PP1 | PP1 | PP1 | PP1 | PP1 | PP1 | PP1 | PP1 |
|  | (parts by mass) | 100 | 100 | 100 | 100 | 100 | 100 | 100 | 100 |
| Absolute evaluation |  |  |  |  |  |  |  |  |  |
| Flexural strength (MPa) |  | 72 | 73 | 74 | 70 | 69 | 69 | 67 | 73 |
| Charpy unnotched impact strength (kJ/m$^2$) |  | 15 | 16 | 17 | 14 | 15 | 15 | 13 | 17 |

TABLE 5-continued

|  |  |  |  |  |  |  |  |  |
|---|---|---|---|---|---|---|---|---|
| Falling weight impact strength (J) | 3 | 3 | 3 | 3 | 3 | 3 | 3 | 3 |
| Fuzz (strand) (points) | 3 | 3 | 3 | 3 | 3 | 3 | 3 | 3 |
| Relative evaluation |  |  |  |  |  |  |  |  |
| Flexural strength (%) | 133 | 135 | 137 | 130 | 128 | 128 | 124 | 135 |
| Charpy unnotched impact strength (%) | 167 | 178 | 189 | 156 | 167 | 167 | 144 | 189 |
| Falling weight impact strength (%) | 150 | 150 | 150 | 150 | 150 | 150 | 150 | 150 |
| Relative comparison standard | Comparative Example 1 | Comparative Example 1 | Comparative Example 1 | Comparative Example 1 | Comparative Example 1 | Comparative Example 1 | Comparative Example 1 | Comparative Example 1 |

|  |  | Example 24 | Example 25 | Example 26 | Example 27 | Example 28 | Example 29 | Example 30 |
|---|---|---|---|---|---|---|---|---|
| Conjugated diene-based polymer (A) | Type | 24-B | 25-B | 26-B | 27-B | 28-B | 29-B | 30-D |
|  | (parts by mass) | 1 | 1 | 1 | 1 | 1 | 1 | 1 |
| Fibers (B) | Type | HT C702 | HT C702 | HT C702 | HT C702 | HT C702 | HT C702 | HT C702 |
|  | (parts by mass) | 20 | 20 | 20 | 20 | 20 | 20 | 20 |
| Thermoplastic resin (C) | Type | PP1 | PP1 | PE | PE | PE | PE | PP1 |
|  | (parts by mass) | 100 | 100 | 100 | 100 | 100 | 100 | 100 |
| Absolute evaluation |  |  |  |  |  |  |  |  |
| Flexural strength (MPa) |  | 74 | 75 | 72 | 73 | 75 | 75 | 100 |
| Charpy unnotched impact strength (kJ/m$^2$) |  | 17 | 18 | 17 | 16 | 16 | 16 | 25 |
| Falling weight impact strength (J) |  | 3 | 3 | 3 | 4 | 4 | 3 | 5 |
| Fuzz (strand) (points) |  | 3 | 3 | 3 | 3 | 3 | 3 | 3 |
| Relative evaluation |  |  |  |  |  |  |  |  |
| Flexural strength (%) |  | 137 | 139 | 195 | 197 | 203 | 203 | 185 |
| Charpy unnotched impact strength (%) |  | 189 | 200 | 340 | 320 | 320 | 320 | 278 |
| Falling weight impact strength (%) |  | 150 | 150 | 300 | 400 | 400 | 300 | 250 |
| Relative comparison standard |  | Comparative Example 1 | Comparative Example 1 | Comparative Example 12 | Comparative Example 12 | Comparative Example 12 | Comparative Example 12 | Comparative Example 1 |

TABLE 6

|  |  | Example 31 | Example 32 | Example 33 | Example 34 | Example 35 | Example 36 | Example 37 | Example 38 |
|---|---|---|---|---|---|---|---|---|---|
| Conjugated diene-based polymer (A) | Type | 31-D | 32-D | 33-D | 34-D | 35-D | 36-D | 17-B | 30-D |
|  | (parts by mass) | 1 | 1 | 1 | 1 | 1 | 1 | 0.07 | 0.07 |
| Fibers (B) | Type | HT C702 | HT C702 | HT C702 | HT C702 | HT C702 | CNF | HT C702 | HT C702 |
|  | (parts by mass) | 20 | 20 | 20 | 20 | 20 | 20 | 20 | 20 |
| Thermoplastic resin (C) | Type | PP1 | PP1 | PP1 | PP1 | PP1 | PE | PP1 | PP1 |
|  | (parts by mass) | 100 | 100 | 100 | 100 | 100 | 100 | 100 | 100 |
| Absolute evaluation |  |  |  |  |  |  |  |  |  |
| Flexural strength (MPa) |  | 98 | 80 | 99 | 101 | 99 | 61 | 69 | 83 |
| Charpy unnotched impact strength (kJ/m$^2$) |  | 23 | 16 | 21 | 28 | 28 | 15 | 12 | 15 |
| Falling weight impact strength (J) |  | 4 | 3 | 5 | 5 | 5 | 3 | 3 | 3 |
| Fuzz (strand) (points) |  | 3 | 3 | 3 | 3 | 3 | 3 | 3 | 3 |
| Relative evaluation |  |  |  |  |  |  |  |  |  |
| Flexural strength (%) |  | 181 | 148 | 183 | 187 | 183 | 203 | 128 | 154 |
| Charpy unnotched impact strength (%) |  | 256 | 178 | 233 | 311 | 311 | 250 | 133 | 167 |
| Falling weight impact strength (%) |  | 200 | 150 | 250 | 250 | 250 | 300 | 150 | 150 |
| Relative comparison standard |  | Comparative Example 1 | Comparative Example 1 | Comparative Example 1 | Comparative Example 1 | Comparative Example 1 | Comparative Example 8 | Comparative Example 1 | Comparative Example 1 |

|  |  | Example 39 | Example 40 | Example 41 | Example 42 | Example 43 | Example 44 | Example 45 |
|---|---|---|---|---|---|---|---|---|
| Conjugated diene-based polymer (A) | Type | 17-B | 31-D | 17-B | 30-D | 17-B | 34-D | 17-B |
|  | (parts by mass) | 0.7 | 0.7 | 3 | 3 | 18 | 18 | 23 |

TABLE 6-continued

| Fibers (B) | Type | HT C702 | HT C702 | HT C702 | HT C702 | HT C702 | HT C702 | HT C702 |
|---|---|---|---|---|---|---|---|---|
| | (parts by mass) | 20 | 20 | 20 | 20 | 20 | 20 | 20 |
| Thermoplastic resin (C) | Type | PP1 | PP1 | PP1 | PP1 | PP1 | PP1 | PP1 |
| | (parts by mass) | 100 | 100 | 100 | 100 | 100 | 100 | 100 |
| Absolute evaluation | | | | | | | | |
| Flexural strength (MPa) | | 71 | 90 | 98 | 120 | 84 | 94 | 75 |
| Charpy unnotched impact strength (kJ/m$^2$) | | 15 | 21 | 23 | 30 | 27 | 32 | 30 |
| Falling weight impact strength (J) | | 3 | 4 | 5 | 8 | 7 | 10 | 10 |
| Fuzz (strand) (points) | | 3 | 3 | 3 | 3 | 3 | 3 | 3 |
| Relative evaluation | | | | | | | | |
| Flexural strength (%) | | 131 | 167 | 181 | 222 | 156 | 174 | 139 |
| Charpy unnotched impact strength (%) | | 167 | 233 | 256 | 333 | 300 | 356 | 333 |
| Falling weight impact strength (%) | | 150 | 200 | 250 | 400 | 350 | 500 | 500 |
| Relative comparison standard | | Comparative Example 1 | Comparative Example 1 | Comparative Example 1 | Comparative Example 1 | Comparative Example 1 | Comparative Example 1 | Comparative Example 1 |

TABLE 7

| | | Example 46 | Example 47 | Example 48 | Example 49 | Example 50 | Example 51 | Example 52 | Example 53 |
|---|---|---|---|---|---|---|---|---|---|
| Conjugated diene-based polymer (A) | Type | 30-D | 17-B | 31-D | 30-D | 34-D | 31-D | 35-D | 17-B |
| | (parts by mass) | 23 | 27 | 27 | 1 | 1 | 1 | 1 | 1 |
| Fibers (B) | Type | HT C702 | HT C702 | HT C702 | HT C110 | HT C205 | HT M100 | GF | HT C702 |
| | (parts by mass) | 20 | 20 | 20 | 20 | 20 | 20 | 20 | 4 |
| Thermoplastic resin (C) | Type | PP1 | PP1 | PP1 | PP1 | PP1 | PP1 | PP1 | PP1 |
| | (parts by mass) | 100 | 100 | 100 | 100 | 100 | 100 | 100 | 100 |
| Absolute evaluation | | | | | | | | | |
| Flexural strength (MPa) | | 87 | 70 | 83 | 93 | 95 | 83 | 83 | 65 |
| Charpy unnotched impact strength (kJ/m$^2$) | | 34 | 32 | 36 | 24 | 24 | 20 | 18 | 15 |
| Falling weight impact strength (J) | | 13 | 11 | 18 | 4 | 4 | 5 | 4 | 3 |
| Fuzz (strand) (points) | | 3 | 3 | 3 | 3 | 3 | 3 | 3 | 3 |
| Relative evaluation | | | | | | | | | |
| Flexural strength (%) | | 161 | 130 | 154 | 172 | 190 | 172 | 160 | 133 |
| Charpy unnotched impact strength (%) | | 378 | 356 | 400 | 267 | 300 | 286 | 257 | 214 |
| Falling weight impact strength (%) | | 650 | 550 | 900 | 200 | 200 | 250 | 200 | 150 |
| Relative comparison standard | | Comparative Example 1 | Comparative Example 1 | Comparative Example 1 | Comparative Example 17 | Comparative Example 18 | Comparative Example 19 | Comparative Example 9 | Comparative Example 20 |

| | | Example 54 | Example 55 | Example 56 | Example 57 | Example 58 | Example 59 | Example 60 |
|---|---|---|---|---|---|---|---|---|
| Conjugated diene-based polymer (A) | Type | 30-D | 17-B | 32-D | 34-D | 33-D | 17-B | 30-D |
| | (parts by mass) | 1 | 1 | 1 | 2 | 2 | 1 | 1 |
| Fibers (B) | Type | HT C702 | HT C702 | HT C702 | HT C702 | HT C702 | HT C702 | HT C702 |
| | (parts by mass) | 4 | 7 | 7 | 40 | 60 | 20 | 60 |
| Thermoplastic resin (C) | Type | PP1 | PP1 | PP1 | PP1 | PP1 | PP2 | PP2 |
| | (parts by mass) | 100 | 100 | 100 | 100 | 100 | 100 | 100 |
| Absolute evaluation | | | | | | | | |
| Flexural strength (MPa) | | 65 | 71 | 72 | 150 | 190 | 97 | 183 |
| Charpy unnotched impact strength (kJ/m$^2$) | | 16 | 17 | 17 | 27 | 30 | 25 | 30 |
| Falling weight impact strength (J) | | 3 | 3 | 3 | 7 | 10 | 4 | 10 |
| Fuzz (strand) (points) | | 3 | 3 | 3 | 3 | 3 | 3 | 3 |
| Relative evaluation | | | | | | | | |
| Flexural strength (%) | | 133 | 142 | 144 | 149 | 142 | 183 | 133 |
| Charpy unnotched impact strength (%) | | 229 | 243 | 243 | 225 | 214 | 313 | 200 |

TABLE 7-continued

| | | | | | | |
|---|---|---|---|---|---|---|
| Falling weight impact strength (%) | 150 | 150 | 150 | 233 | 250 | 200 | 250 |
| Relative comparison standard | Comparative Example 20 | Comparative Example 21 | Comparative Example 21 | Comparative Example 22 | Comparative Example 23 | Comparative Example 10 | Comparative Example 24 |

TABLE 8

| | | Example 61 | Example 62 | Example 63 | Example 64 | Example 65 | Example 66 | Example 67 |
|---|---|---|---|---|---|---|---|---|
| Conjugated diene-based polymer (A) | Type | 17-B | 34-D | 36-D | 17-B | 30-D | 30-D | 36-D |
| | (parts by mass) | 1 | 1 | 1 | 1 | 1 | 1 | 1 |
| Fibers (B) | Type | HT C702 | HT C702 | HT C702 | HT C702 | HT C702 | HT C702 | HT C702 |
| | (parts by mass) | 20 | 60 | 20 | 20 | 60 | 20 | 60 |
| Thermoplastic resin (C) | Type | PP3 | PP3 | PE | PA6 | PA6 | PA9T | PA9T |
| | (parts by mass) | 100 | 100 | 100 | 100 | 100 | 100 | 100 |
| Absolute evaluation | | | | | | | | |
| Flexural strength (MPa) | | 99 | 186 | 84 | 151 | 183 | 144 | 180 |
| Charpy unnotched impact strength (kJ/m$^2$) | | 25 | 32 | 17 | 23 | 30 | 24 | 31 |
| Falling weight impact strength (J) | | 3 | 9 | 4 | 5 | 11 | 6 | 11 |
| Fuzz (strand) (points) | | 3 | 3 | 3 | 3 | 3 | 3 | 3 |
| Relative evaluation | | | | | | | | |
| Flexural strength (%) | | 174 | 140 | 227 | 123 | 120 | 125 | 121 |
| Charpy unnotched impact strength (%) | | 250 | 246 | 340 | 121 | 136 | 114 | 155 |
| Falling weight impact strength (%) | | 150 | 225 | 400 | 250 | 220 | 200 | 220 |
| Relative comparison standard | | Comparative Example 11 | Comparative Example 25 | Comparative Example 12 | Comparative Example 13 | Comparative Example 26 | Comparative Example 14 | Comparative Example 27 |

| | | Example 68 | Example 69 | Example 70 | Example 71 | Example 72 | Example 73 | Example 74 |
|---|---|---|---|---|---|---|---|---|
| Conjugated diene-based polymer (A) | Type | 17-B | 30-D | 36-D | 36-D | 35-D | 35-D | 43-D |
| | (parts by mass) | 1 | 1 | 2 | 2 | 2 | 2 | 1 |
| Fibers (B) | Type | HT C702 | HT C702 | CNF | CNF | CNF | CNF | HT C702 |
| | (parts by mass) | 20 | 60 | 40 | 60 | 40 | 60 | 20 |
| Thermoplastic resin (C) | Type | PPS | PPS | PE | PE | PP1 | PP1 | PP1 |
| | (parts by mass) | 100 | 100 | 100 | 100 | 100 | 100 | 100 |
| Absolute evaluation | | | | | | | | |
| Flexural strength (MPa) | | 153 | 185 | 89 | 123 | 132 | 176 | 109 |
| Charpy unnotched impact strength (kJ/m$^2$) | | 20 | 32 | 18 | 23 | 23 | 25 | 26 |
| Falling weight impact strength (J) | | 5 | 10 | 5 | 8 | 6 | 8 | 6 |
| Fuzz (strand) (points) | | 3 | 3 | 3 | 3 | 3 | 3 | 3 |
| Relative evaluation | | | | | | | | |
| Flexural strength (%) | | 121 | 119 | 193 | 208 | 197 | 220 | 202 |
| Charpy unnotched impact strength (%) | | 111 | 152 | 257 | 256 | 288 | 250 | 289 |
| Falling weight impact strength (%) | | 250 | 250 | 250 | 400 | 300 | 400 | 300 |
| Relative comparison standard | | Comparative Example 15 | Comparative Example 28 | Comparative Example 29 | Comparative Example 30 | Comparative Example 31 | Comparative Example 32 | Comparative Example 1 |

TABLE 9

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Conjugated diene-based polymer (A) | Type | — | 17-B | 17-B | — | 32-D | 17-B | — | — |
| | (parts by mass) | — | 1 | 1 | — | 40 | 1 | — | — |

TABLE 9-continued

| Fibers (B) | Type | HT C702 | — | Mg(OH)$_2$ | Mg(OH)$_2$ | HT C702 | HT C702 | HT M100 | CNF |
|---|---|---|---|---|---|---|---|---|---|
| | (parts by mass) | 20 | — | 20 | 20 | 20 | 170 | 20 | 20 |
| Thermoplastic resin (C) | Type | PP1 | PP1 | PP1 | PP1 | PP1 | PP1 | PP1 | PE |
| | (parts by mass) | 100 | 100 | 100 | 100 | 100 | 100 | 100 | 100 |
| Absolute evaluation | | | | | | | | | |
| Flexural strength (MPa) | | 54 | 35 | 43 | 40 | 48 | 68 | 43 | 30 |
| Charpy unnotched impact strength (kJ/m$^2$) | | 9 | 50 | 9 | 7 | 38 | 10 | 6 | 6 |
| Falling weight impact strength (J) | | 2 | 2 | 1 | 1 | 18 | 2 | 1 | 1 |
| Fuzz (strand) (points) | | 1 | 3 | 3 | 3 | 3 | 1 | 1 | 1 |
| Relative evaluation | | | | | | | | | |
| Flexural strength (%) | | 100 | 65 | 108 | 100 | 89 | 77 | 100 | 100 |
| Charpy unnotched impact strength (%) | | 100 | 556 | 129 | 100 | 422 | 83 | 100 | 100 |
| Falling weight impact strength (%) | | 100 | 100 | 100 | 100 | 900 | 67 | 100 | 100 |
| Relative comparison standard | | Comparative Example 1 | Comparative Example 1 | Comparative Example 4 | Comparative Example 4 | Comparative Example 1 | Comparative Example 37 | Comparative Example 7 | Comparative Example 8 |

| | | Comparative Example 9 | Comparative Example 10 | Comparative Example 11 | Comparative Example 12 | Comparative Example 13 | Comparative Example 14 | Comparative Example 15 | Comparative Example 16 |
|---|---|---|---|---|---|---|---|---|---|
| Conjugated diene-based polymer (A) | Type | — | — | — | — | — | — | — | — |
| | (parts by mass) | — | — | — | — | — | — | — | — |
| Fibers (B) | Type | GF | HT C702 | HT C702 | HT C702 | HT C702 | HT C702 | HT C702 | HT C702 |
| | (parts by mass) | 20 | 20 | 20 | 20 | 20 | 20 | 20 | 20 |
| Thermoplastic resin (C) | Type | PP1 | PP2 | PP3 | PE | PA6 | PA9T | PPS | PP3b |
| | (parts by mass) | 100 | 100 | 100 | 100 | 100 | 100 | 100 | 100 |
| Absolute evaluation | | | | | | | | | |
| Flexural strength (MPa) | | 52 | 53 | 57 | 37 | 123 | 115 | 126 | 58 |
| Charpy unnotched impact strength (kJ/m$^2$) | | 7 | 8 | 10 | 5 | 19 | 21 | 18 | 10 |
| Falling weight impact strength (J) | | 2 | 2 | 2 | 1 | 2 | 3 | 2 | 2 |
| Fuzz (strand) (points) | | 1 | 1 | 1 | 1 | 1 | 1 | 1 | 1 |
| Relative evaluation | | | | | | | | | |
| Flexural strength (%) | | 100 | 100 | 100 | 100 | 100 | 100 | 100 | 100 |
| Charpy unnotched impact strength (%) | | 100 | 100 | 100 | 100 | 100 | 100 | 100 | 100 |
| Falling weight impact strength (%) | | 100 | 100 | 100 | 100 | 100 | 100 | 100 | 100 |
| Relative comparison standard | | Comparative Example 9 | Comparative Example 10 | Comparative Example 11 | Comparative Example 12 | Comparative Example 13 | Comparative Example 14 | Comparative Example 15 | Comparative Example 16 |

TABLE 10

| | | Comparative Example 17 | Comparative Example 18 | Comparative Example 19 | Comparative Example 20 | Comparative Example 21 | Comparative Example 22 | Comparative Example 23 | Comparative Example 24 |
|---|---|---|---|---|---|---|---|---|---|
| Conjugated diene-based polymer (A) | Type | — | — | — | — | — | — | — | — |
| | (parts by mass) | — | — | — | — | — | — | — | — |
| Fibers (B) | Type | HT C110 | HT C205 | HT M100 | HT C702 | HT C702 | HT C702 | HT C702 | HT C702 |
| | (parts by mass) | 20 | 20 | 20 | 4 | 7 | 40 | 60 | 60 |
| Thermoplastic resin (C) | Type | PP1 | PP1 | PP1 | PP1 | PP1 | PP1 | PP1 | PP2 |
| | (parts by mass) | 100 | 100 | 100 | 100 | 100 | 100 | 100 | 100 |
| Absolute evaluation | | | | | | | | | |
| Flexural strength (MPa) | | 54 | 50 | 48 | 49 | 50 | 101 | 134 | 138 |
| Charpy unnotched impact strength (kJ/m$^2$) | | 9 | 8 | 7 | 7 | 7 | 12 | 14 | 15 |
| Falling weight impact strength (J) | | 2 | 2 | 2 | 2 | 2 | 3 | 4 | 4 |
| Fuzz (strand) (points) | | 1 | 1 | 2 | 1 | 1 | 1 | 1 | 1 |

TABLE 10-continued

| Relative evaluation | | | | | | | | |
|---|---|---|---|---|---|---|---|---|
| Flexural strength (%) | 100 | 100 | 100 | 100 | 100 | 100 | 100 | 100 |
| Charpy unnotched impact strength (%) | 100 | 100 | 100 | 100 | 100 | 100 | 100 | 100 |
| Falling weight impact strength (%) | 100 | 100 | 100 | 100 | 100 | 100 | 100 | 100 |
| Relative comparison standard | Comparative Example 17 | Comparative Example 18 | Comparative Example 19 | Comparative Example 20 | Comparative Example 21 | Comparative Example 22 | Comparative Example 23 | Comparative Example 24 |

| | | Comparative Example 25 | Comparative Example 26 | Comparative Example 27 | Comparative Example 28 | Comparative Example 29 | Comparative Example 30 | Comparative Example 31 | Comparative Example 32 |
|---|---|---|---|---|---|---|---|---|---|
| Conjugated diene-based polymer (A) | Type | — | — | — | — | — | — | — | — |
| | (parts by mass) | — | — | — | — | — | — | — | — |
| Fibers (B) | Type | HT C702 | HT C702 | HT C702 | HT C702 | CNF | CNF | CNF | CNF |
| | (parts by mass) | 60 | 60 | 60 | 60 | 40 | 60 | 40 | 60 |
| Thermoplastic resin (C) | Type | PP3 | PA6 | PA9T | PPS | PE | PE | PP1 | PP1 |
| | (parts by mass) | 100 | 100 | 100 | 100 | 100 | 100 | 100 | 100 |
| Absolute evaluation | | | | | | | | | |
| Flexural strength (MPa) | | 133 | 153 | 149 | 155 | 46 | 59 | 67 | 80 |
| Charpy unnotched impact strength (kJ/m$^2$) | | 13 | 22 | 20 | 21 | 7 | 9 | 8 | 10 |
| Falling weight impact strength (J) | | 4 | 5 | 5 | 4 | 2 | 2 | 2 | 2 |
| Fuzz (strand) (points) | | 1 | 1 | 1 | 1 | 1 | 1 | 1 | 1 |
| Relative evaluation | | | | | | | | | |
| Flexural strength (%) | | 100 | 100 | 100 | 100 | 100 | 100 | 100 | 100 |
| Charpy unnotched impact strength (%) | | 100 | 100 | 100 | 100 | 100 | 100 | 100 | 100 |
| Falling weight impact strength (%) | | 100 | 100 | 100 | 100 | 100 | 100 | 100 | 100 |
| Relative comparison standard | | Comparative Example 25 | Comparative Example 26 | Comparative Example 27 | Comparative Example 28 | Comparative Example 29 | Comparative Example 30 | Comparative Example 31 | Comparative Example 32 |

TABLE 11

| | | Comparative Example 33 | Comparative Example 34 | Comparative Example 35 | Comparative Example 36 | Comparative Example 37 |
|---|---|---|---|---|---|---|
| Polymer | Type | 37-A | 38-B | 39-A | 41-B | — |
| | (parts by mass) | 1 | 1 | 1 | 1 | — |
| Fibers (B) | Type | HT C702 | HT C702 | HT C702 | HT C702 | HT C702 |
| | (parts by mass) | 20 | 20 | 20 | 20 | 170 |
| Thermoplastic resin (C) | Type | PP1 | PP1 | PP1 | PP1 | PP1 |
| | (parts by mass) | 100 | 100 | 100 | 100 | 100 |
| Absolute evaluation | | | | | | |
| Flexural strength (MPa) | | 50 | 51 | 50 | 50 | 88 |
| Charpy unnotched impact strength (kJ/m$^2$) | | 8 | 8 | 7 | 6 | 12 |
| Falling weight impact strength (J) | | 1 | 1 | 1 | 1 | 3 |
| Fuzz (strand) (points) | | 2 | 2 | 2 | 2 | 1 |
| Relative evaluation | | | | | | |
| Flexural strength (%) | | 93 | 94 | 93 | 93 | 100 |
| Charpy unnotched impact strength (%) | | 89 | 89 | 78 | 67 | 100 |
| Falling weight impact strength (%) | | 50 | 50 | 50 | 50 | 100 |
| Relative comparison standard | | Comparative Example 1 | Comparative Example 1 | Comparative Example 1 | Comparative Example 1 | Comparative Example 37 |

The details of the component (B) and the component (C) listed in each table are as follows.

<Fibers (B)>

HT C110 (trade name): Carbon fibers manufactured by Toho Tenax Co., Ltd. (average fiber length: 6 mm)

HT C702 (trade name): Carbon fibers manufactured by Toho Tenax Co., Ltd. (average fiber length: 6 mm)

HT C205 (trade name): Carbon fibers manufactured by Toho Tenax Co., Ltd. (average fiber length: 6 mm)

HT M100 (trade name): Carbon fibers manufactured by Toho Tenax Co., Ltd. (average fiber length: 40 micrometers)

CNF: Fibers obtained by charging a Plastomill 50MR (trade name) (100 cc) (manufactured by Toyo Seiki Seisaku-Sho, Ltd.) with 72 g of cellulose ("KC Flock W-400G" (trade name) manufactured by Nippon Paper Chemicals Co., Ltd.), 8.6 g of maleic anhydride, and 0.7 g of dicumyl peroxide, and mixing the mixture at 170° C. for 30 minutes at a rotational speed of 50 rpm using a roller-type rotor GF: Chopped glass fibers "CS03MAA51A" (trade name) manufactured by Owens Corning Corporation (average fiber length: 3 mm, average fiber diameter: 13 micrometers)

$Mg(OH)_2$: Particulate magnesium hydroxide "KISUMA 5" (trade name) manufactured by Kyowa Chemical Industry Co., Ltd. (average particle size: 0.8 micrometers)

<Thermoplastic Resin (C)>

PP1: Block-type polypropylene "NOVATEC BC06C" (trade name) manufactured by Japan Polypropylene Corporation PP2: Random-type polypropylene "NOVATEC MG05ES" (trade name) manufactured by Japan Polypropylene Corporation PP3: Homo-type polypropylene "NOVATEC SA06GA" (trade name) manufactured by Japan Polypropylene Corporation PP3b: Polypropylene "NOVATEC MA1B" (trade name) manufactured by Japan Polypropylene Corporation PE: High-density polyethylene "SUNTEC HD J320" (trade name) manufactured by Asahi Kasei Chemicals Corporation PA6: Polyamide resin "AMILAN CM1017" (trade name) manufactured by Toray Industries Inc.

PA9T: Polyamide resin "Genestar N1000A" (trade name) manufactured by Kuraray Co., Ltd.

PPS: Polyphenylene sulfide "DURAFIDE 0220A9" (trade name) manufactured by Polyplastics Co., Ltd.

3.6. Evaluation Results

According to Comparative Examples 1, 7 to 32, and 37 in which the component (A) was not used, the flexural strength, the Charpy unnotched impact strength, and the falling weight impact strength were inferior to those obtained in the examples, and the strand fuzzed.

According to Comparative Example 2 in which the component (B) was not used, the flexural strength and the falling weight impact strength were inferior to those obtained in the examples.

According to Comparative Examples 3 and 4 in which $Mg(OH)_2$ was used instead of the component (B), the flexural strength, the Charpy unnotched impact strength, and the falling weight impact strength were inferior to those obtained in the examples in which the component (B) was used.

According to Comparative Example 5 in which the component (A) was used in a ratio as high as 40 parts by mass based on 100 parts by mass of the component (C), the flexural strength was inferior to those obtained in the examples.

According to Comparative Example 6 in which the component (B) was used in a ratio as high as 170 parts by mass based on 100 parts by mass of the component (C), the falling weight impact strength was inferior to those obtained in the examples, and the strand fuzzed.

According to Comparative Examples 33 to 36 in which the component (A) that did not include an alkoxysilyl group and an amino group was used, the flexural strength, the Charpy unnotched impact strength, and the falling weight impact strength were inferior to those obtained in the examples, and the strand fuzzed.

3.7. Preparation of Sizing Agent

A sizing agent was prepared as described below.

(1) Preparation Method A

A conical flask was charged with 100 g of the conjugated diene-based polymer (A) (obtained as described above) and 900 g of cyclohexane, and the conjugated diene-based polymer (A) was dissolved in cyclohexane at room temperature to prepare a solution including the conjugated diene-based polymer (A). A 2 L glass beaker was charged sequentially with 350 g of water, 640 g of the solution prepared as described above, and 25.6 g of a 25% aqueous solution including Emulgen 147 (trade name, polyoxyethylene lauryl ether) manufactured by Kao Corporation, and the mixture was stirred at 13,000 rpm for 10 minutes using a homomixer "MARK II" (trade name) manufactured by PRIMIX Corporation. The mixture was transferred to a rotary evaporator "N-11" (trade name) manufactured by Tokyo Rikakikai Co, Ltd., and cyclohexane was removed to obtain an aqueous emulsified dispersion (sizing agent).

(2) Preparation Method B

A solution including the conjugated diene-based polymer (A) was prepared in the same manner as in the preparation method A. The subsequent operation was performed in the same manner as in the preparation method A, except that the stirring speed and the stirring time were respectively changed to 5,000 rpm and 3 minutes, to obtain a sizing agent (aqueous emulsified dispersion).

(3) Preparation Method C

A solution including the conjugated diene-based polymer (A) was prepared in the same manner as in the preparation method A. The subsequent operation was performed in the same manner as in the preparation method A, except that the amount of the 25% aqueous solution including Emulgen 147 was changed to 76.8 g, and the stirring time was changed to 30 minutes, to obtain a sizing agent (aqueous emulsified dispersion).

(4) Preparation Method D

A conical flask was charged with 400 g of the conjugated diene-based polymer (A) (obtained as described above) and 600 g of cyclohexane, and the conjugated diene-based polymer (A) was dissolved in cyclohexane at room temperature to prepare a solution including the conjugated diene-based polymer (A). The subsequent operation was performed in the same manner as in the preparation method A, except that the amount of water was changed to 109 g, to obtain a sizing agent (aqueous emulsified dispersion).

(5) Preparation Method E

A conical flask was charged with 50 g of the conjugated diene-based polymer (A) (obtained as described above) and 950 g of cyclohexane, and the conjugated diene-based polymer (A) was dissolved in cyclohexane at room temperature to obtain a sizing agent (polymer solution).

(6) Preparation Method F

A sizing agent (polymer solution) was obtained in the same manner as in the preparation method E, except that toluene was used instead of cyclohexane.

(7) Preparation Method G

A solution including the conjugated diene-based polymer (A) was prepared in the same manner as in the preparation method A. The subsequent operation was performed in the same manner as in the preparation method A, except that 3.2 g of a 10% aqueous solution including NEOGEN S-20F (trade name, sodium dodecylbenzenesulfonate) manufactured by DKS Co. Ltd. was further added, to obtain a sizing agent (aqueous emulsified dispersion).

(8) Preparation Method H

A conical flask was charged sequentially with 25 g of a commercially-available sizing agent, 100 g of water, and 1 g of a 25% aqueous solution including Emulgen 147 manufactured by Kao Corporation, and the mixture was stirred with heating to obtain a sizing agent (aqueous emulsified dispersion).

3.8. Examples 75 to 122 and Comparative Examples 38 to 56

3.8.1. Sizing

Each of the sizing agents obtained using the preparation methods A to D, G; and H was diluted with water so that the concentration of the conjugated diene-based polymer (A) was 5 mass %, and put in a treatment bath. Each of the sizing agents obtained using the preparation methods E and F was directly put in a treatment bath. The sizing agent adhering to TORAYCA T700SC-12000-50C (trade name, carbon fibers) manufactured by Toray Industries Inc. was removed using acetone. The fibers were continuously immersed in the treatment bath so that the conjugated diene-based polymer (A) or the commercially-available sizing agent adhered to the fibers while adjusting the roller gap conditions so that the sizing agent adhered to the fibers in the amount listed in Tables 12 to 17. The fibers were subsequently dried in an oven at 120° C. for 5 minutes to prepare fibers to which the conjugated diene-based polymer (A) or the commercially-available sizing agent adhered.

3.8.2. Property Measurement Methods and Evaluation Methods (1) Measurement of Interfacial Shear Strength One fiber to which the conjugated diene-based polymer (A) or the commercially-available sizing agent adhered was removed, and the interfacial shear strength was measured by a micro-droplet method using a composite material interfacial property evaluation device ("HM410" manufactured by Tohei Sangyo Co., Ltd.). More specifically, the fiber was placed in the device, and a droplet of the thermoplastic resin (C) (see Tables 12 to 17) that had been melted was formed on the fiber, followed by sufficient cooling at room temperature to obtain a measurement specimen. The measurement specimen was placed in the device again, and the droplet was sandwiched between the blades. The measurement specimen was moved at a speed of 0.12 mm/min to measure the maximum pull-out load F when the fiber was removed from the droplet. The interfacial shear strength tau was calculated using the following expression. The results are listed in Tables 12 to 17.

$$tau = F/piDL$$

where,

F is the maximum stress (N) that occurs when the thermoplastic resin is removed from the carbon fiber, D is the diameter (m) of the carbon fiber, and L is the diameter (m) of the thermoplastic resin in the axial direction of the carbon fiber.

(2) Other Evaluations

The flexural strength, the Charpy unnotched impact strength, the falling weight impact strength, and the occurrence of fuzz (strand) were evaluated as described above (see "3.2. Composition property measurement methods and evaluation methods").

3.8.3. Production of Resin Composition

The fibers to which the conjugated diene-based polymer (A) or the commercially-available sizing agent adhered were cut to have a length of 6 mm. 0.1 parts by mass of pentaerythritol tetrakis[3-(3,5-di-tert-butyl-4-hydroxyphenyl)propionate] ("ADK STAB AO-60" manufactured by Adeka Corporation) (antioxidant), and 0.1 parts by mass of tris(2,4-di-tert-butylphenyl) phosphite ("ADK STAB 2112" manufactured by Adeka Corporation) were added to the fibers (B) (see above) and the thermoplastic resin(C) listed in Tables 12 to 16, and the mixture was manually blended at room temperature. The mixture was melt-mixed using a single-screw extruder "FS40" manufactured by Ikegai Corp. to obtain pellets. When PP1, PP2, PP3b, or PE was used as the thermoplastic resin (C), the cylinder temperature during melt-mixing was set so that the temperature around the base of the hopper was 140° C., and the temperature around the outlet was 200° C. (i.e., a temperature gradient was formed). When PA6 was used as the thermoplastic resin (C), the temperature around the base of the hopper was set to 170° C., and the temperature around the outlet was set to 240° C. When PA9T or PPS was used as the thermoplastic resin (C), the temperature around the base of the hopper was set to 260° C., and the temperature around the outlet was set to 320° C.

After sufficiently drying the pellets, an alignment plate (width: 150 mm, length: 150 mm, thickness: 2 mm) was formed using an injection molding machine "IS-170FA" manufactured by Toshiba Machine Co., Ltd. A specimen (width: 15 mm, length: 150 mm, thickness: 2 mm) was cut from the resulting plate in the machine direction (MD) using a universal cutter, cut using a specimen preparation device "IDT-3" manufactured by Toyo Baldwin (see below), and evaluated. When PP1, PP2, PP3b, or PE was used as the thermoplastic resin (C), the cylinder temperature was set so that the temperature around the base of the hopper was 170° C., and the temperature around the nozzle was 200° C. (i.e., a temperature gradient was formed). When PA6 was used as the thermoplastic resin (C), the temperature around the base of the hopper was set to 170° C., and the temperature around the nozzle was set to 240° C. When PA9T or PPS was used as the thermoplastic resin (C), the temperature around the base of the hopper was set to 260° C., and the temperature around the nozzle was set to 320° C.

The composition of each example and comparative example, and the evaluation results are listed in Tables 12 to 17.

TABLE 12

| | | Example 75 | Example 76 | Example 77 | Example 78 | Example 79 | Example 80 |
|---|---|---|---|---|---|---|---|
| Composition of sizing agent | | | | | | | |
| Conjugated diene-based polymer (A) Type | | 5-C | 6-C | 7-C | 8-C | 9-C | 10-C |
| Preparation method | | A | D | A | A | A | A |
| Average particle size of conjugated diene-based polymer (A) | (micrometers) | 1.1 | 3.9 | 1.2 | 1.1 | 1.2 | 1.4 |
| Content of conjugated diene-based polymer (A) | (%) | 7 | 35 | 7 | 7 | 7 | 7 |

TABLE 12-continued

|  |  |  |  |  |  |  |  |
|---|---|---|---|---|---|---|---|
| Adhesion of conjugated diene-based polymer (A) | (mass %) | 1.8 | 3.2 | 1.2 | 17.1 | 8.3 | 2.0 |
| Conjugated diene-based polymer (A) | (parts by mass) | 0.4 | 0.6 | 0.2 | 3.4 | 1.7 | 0.4 |
| Fibers (B) | (parts by mass) | 20 | 20 | 20 | 20 | 20 | 20 |
| Thermoplastic resin (C) | Type | PP1 | PP1 | PP1 | PP1 | PP1 | PP1 |
|  | (parts by mass) | 100 | 100 | 100 | 100 | 100 | 100 |
| Absolute evaluation |  |  |  |  |  |  |  |
| Interfacial shear strength | (MPa) | 18 | 19 | 18 | 16 | 17 | 19 |
| Flexural strength | (MPa) | 73 | 75 | 76 | 72 | 73 | 76 |
| Charpy unnotched impact strength | (kJ/m$^2$) | 13 | 14 | 14 | 11 | 12 | 14 |
| Falling weight impact strength | (J) | 3 | 3 | 3 | 3 | 3 | 3 |
| Fuzz (strand) | (points) | 3 | 3 | 3 | 3 | 3 | 3 |
| Relative evaluation |  |  |  |  |  |  |  |
| Flexural strength | (%) | 146 | 150 | 152 | 144 | 146 | 152 |
| Charpy unnotched impact strength | (%) | 130 | 140 | 140 | 110 | 120 | 140 |
| Falling weight impact strength | (%) | 300 | 300 | 300 | 300 | 300 | 300 |
| Relative comparison standard |  | Comparative Example 38 | Comparative Example 38 | Comparative Example 38 | Comparative Example 38 | Comparative Example 38 | Comparative Example 38 |

|  |  | Example 81 | Example 82 | Example 83 | Example 84 | Example 85 |
|---|---|---|---|---|---|---|
| Composition of sizing agent |  |  |  |  |  |  |
| Conjugated diene-based polymer (A) | Type | 11-C | 12-C | 13-C | 14-A | 15-A |
| Preparation method |  | B | C | A | A | B |
| Average particle size of conjugated diene-based polymer (A) | (micrometers) | 73 | 0.5 | 1.3 | 1.4 | 68 |
| Content of conjugated diene-based polymer (A) | (%) | 7 | 7 | 7 | 7 | 7 |
| Adhesion of conjugated diene-based polymer (A) | (mass %) | 4.5 | 1.2 | 1.8 | 2.0 | 4.3 |
| Conjugated diene-based polymer (A) | (parts by mass) | 0.9 | 0.2 | 0.4 | 0.4 | 0.9 |
| Fibers (B) | (parts by mass) | 20 | 20 | 20 | 20 | 20 |
| Thermoplastic resin (C) | Type | PP1 | PP1 | PP1 | PP1 | PP1 |
|  | (parts by mass) | 100 | 100 | 100 | 100 | 100 |
| Absolute evaluation |  |  |  |  |  |  |
| Interfacial shear strength | (MPa) | 17 | 17 | 17 | 18 | 19 |
| Flexural strength | (MPa) | 73 | 74 | 73 | 75 | 77 |
| Charpy unnotched impact strength | (kJ/m$^2$) | 13 | 13 | 13 | 13 | 13 |
| Falling weight impact strength | (J) | 3 | 3 | 3 | 3 | 3 |
| Fuzz (strand) | (points) | 3 | 3 | 3 | 3 | 3 |
| Relative evaluation |  |  |  |  |  |  |
| Flexural strength | (%) | 146 | 148 | 146 | 150 | 154 |
| Charpy unnotched impact strength | (%) | 130 | 130 | 130 | 130 | 130 |
| Falling weight impact strength | (%) | 300 | 300 | 300 | 300 | 300 |
| Relative comparison standard |  | Comparative Example 38 | Comparative Example 38 | Comparative Example 38 | Comparative Example 38 | Comparative Example 38 |

TABLE 13

|  |  | Example 86 | Example 87 | Example 88 | Example 89 | Example 90 | Example 91 |
|---|---|---|---|---|---|---|---|
| Composition of sizing agent |  |  |  |  |  |  |  |
| Conjugated diene-based polymer (A) | Type | 16-B | 17-B | 18-B | 19-B | 20-B | 21-B |
| Preparation method |  | B | A | D | C | A | A |
| Average particle size of conjugated diene-based polymer (A) | (micrometers) | 68 | 1.4 | 3.8 | 0.4 | 1.3 | 1.2 |
| Content of conjugated diene-based polymer (A) | (%) | 7 | 7 | 35 | 7 | 7 | 7 |
| Adhesion of conjugated diene-based polymer (A) | (mass %) | 4.2 | 1.8 | 3.6 | 1.6 | 1.9 | 1.8 |
| Conjugated diene-based polymer (A) | (parts by mass) | 0.8 | 0.4 | 0.7 | 0.3 | 0.4 | 0.4 |
| Fibers (B) | (parts by mass) | 20 | 20 | 20 | 20 | 20 | 20 |

TABLE 13-continued

| | | | | | | | |
|---|---|---|---|---|---|---|---|
| Thermoplastic resin (C) | Type | PP1 | PP1 | PP1 | PP1 | PP1 | PP1 |
| | (parts by mass) | 100 | 100 | 100 | 100 | 100 | 100 |
| Absolute evaluation | | | | | | | |
| Interfacial shear strength | (MPa) | 20 | 20 | 21 | 19 | 19 | 19 |
| Flexural strength | (MPa) | 82 | 82 | 83 | 79 | 78 | 78 |
| Charpy unnotched impact strength | (kJ/m$^2$) | 17 | 18 | 19 | 16 | 17 | 17 |
| Falling weight impact strength | (J) | 4 | 4 | 4 | 4 | 4 | 4 |
| Fuzz (strand) | (points) | 3 | 3 | 3 | 3 | 3 | 3 |
| Relative evaluation | | | | | | | |
| Flexural strength | (%) | 164 | 164 | 166 | 158 | 156 | 156 |
| Charpy unnotched impact strength | (%) | 170 | 180 | 190 | 160 | 170 | 170 |
| Falling weight impact strength | (%) | 400 | 400 | 400 | 400 | 400 | 400 |
| Relative comparison standard | | Comparative Example 38 | Comparative Example 38 | Comparative Example 38 | Comparative Example 38 | Comparative Example 38 | Comparative Example 38 |

| | | Example 92 | Example 93 | Example 94 | Example 95 | Example 96 |
|---|---|---|---|---|---|---|
| Composition of sizing agent | | | | | | |
| Conjugated diene-based polymer (A) | Type | 22-B | 23-B | 24-B | 25-B | 26-B |
| Preparation method | | A | A | A | A | A |
| Average particle size of conjugated diene-based polymer (A) | (micrometers) | 1.3 | 1.4 | 1.5 | 1.2 | 1.3 |
| Content of conjugated diene-based polymer (A) | (%) | 7 | 7 | 7 | 7 | 7 |
| Adhesion of conjugated diene-based polymer (A) | (mass %) | 2.0 | 1.8 | 1.9 | 1.9 | 1.8 |
| Conjugated diene-based polymer (A) | (parts by mass) | 0.4 | 0.4 | 0.4 | 0.4 | 0.4 |
| Fibers (B) | (parts by mass) | 20 | 20 | 20 | 20 | 20 |
| Thermoplastic resin (C) | Type | PP1 | PP1 | PP1 | PP1 | PE |
| | (parts by mass) | 100 | 100 | 100 | 100 | 100 |
| Absolute evaluation | | | | | | |
| Interfacial shear strength | (MPa) | 18 | 20 | 21 | 21 | 20 |
| Flexural strength | (MPa) | 77 | 79 | 81 | 82 | 79 |
| Charpy unnotched impact strength | (kJ/m$^2$) | 16 | 19 | 19 | 19 | 18 |
| Falling weight impact strength | (J) | 4 | 4 | 4 | 4 | 4 |
| Fuzz (strand) | (points) | 3 | 3 | 3 | 3 | 3 |
| Relative evaluation | | | | | | |
| Flexural strength | (%) | 154 | 158 | 162 | 164 | 226 |
| Charpy unnotched impact strength | (%) | 160 | 190 | 190 | 190 | 360 |
| Falling weight impact strength | (%) | 400 | 400 | 400 | 400 | 400 |
| Relative comparison standard | | Comparative Example 38 | Comparative Example 38 | Comparative Example 38 | Comparative Example 38 | Comparative Example 53 |

TABLE 14

| | | Example 97 | Example 98 | Example 99 | Example 100 | Example 101 | Example 102 |
|---|---|---|---|---|---|---|---|
| Composition of sizing agent | | | | | | | |
| Conjugated diene-based polymer (A) | Type | 27-B | 28-B | 29-B | 30-D | 31-D | 32-D |
| Preparation method | | A | A | A | A | B | C |
| Average particle size of conjugated diene-based polymer (A) | (micrometers) | 1.3 | 1.2 | 1.5 | 1.5 | 72 | 0.6 |
| Content of conjugated diene-based polymer (A) | (%) | 7 | 7 | 7 | 7 | 7 | 7 |
| Adhesion of conjugated diene-based polymer (A) | (mass %) | 1.9 | 1.7 | 1.7 | 1.9 | 4.4 | 1.2 |
| Conjugated diene-based polymer (A) | (parts by mass) | 0.4 | 0.3 | 0.3 | 0.4 | 0.9 | 0.2 |
| Fibers (B) | (parts by mass) | 20 | 20 | 20 | 20 | 20 | 20 |
| Thermoplastic resin (C) | Type | PE | PE | PE | PP1 | PP1 | PP1 |
| | (parts by mass) | 100 | 100 | 100 | 100 | 100 | 100 |
| Absolute evaluation | | | | | | | |
| Interfacial shear strength | (MPa) | 21 | 22 | 22 | 30 | 29 | 28 |
| Flexural strength | (MPa) | 80 | 83 | 83 | 112 | 109 | 103 |

TABLE 14-continued

|  |  |  |  |  |  |  |  |
|---|---|---|---|---|---|---|---|
| Charpy unnotched impact strength | (kJ/m²) | 18 | 18 | 18 | 28 | 26 | 19 |
| Falling weight impact strength | (J) | 4 | 4 | 4 | 5 | 5 | 5 |
| Fuzz (strand) | (points) | 3 | 3 | 3 | 3 | 3 | 3 |
| Relative evaluation |  |  |  |  |  |  |  |
| Flexural strength | (%) | 229 | 237 | 237 | 224 | 218 | 206 |
| Charpy unnotched impact strength | (%) | 360 | 360 | 360 | 280 | 260 | 190 |
| Falling weight impact strength | (%) | 400 | 400 | 400 | 500 | 500 | 500 |
| Relative comparison standard |  | Comparative Example 53 | Comparative Example 53 | Comparative Example 53 | Comparative Example 38 | Comparative Example 38 | Comparative Example 38 |

|  |  | Example 103 | Example 104 | Example 105 | Example 106 | Example 107 | Example 108 |
|---|---|---|---|---|---|---|---|
| Composition of sizing agent |  |  |  |  |  |  |  |
| Conjugated diene-based polymer (A) | Type | 33-D | 34-D | 35-D | 36-D | 17-B | 30-D |
| Preparation method |  | D | A | A | A | A | A |
| Average particle size of conjugated diene-based polymer (A) | (micrometers) | 3.4 | 1.5 | 1.2 | 1.3 | 1.4 | 1.5 |
| Content of conjugated diene-based polymer (A) | (%) | 35 | 7 | 7 | 7 | 7 | 7 |
| Adhesion of conjugated diene-based polymer (A) | (mass %) | 4.7 | 2.0 | 2.2 | 1.9 | 1.8 | 1.9 |
| Conjugated diene-based polymer (A) | (parts by mass) | 0.9 | 0.4 | 0.4 | 0.4 | 0.4 | 0.4 |
| Fibers (B) | (parts by mass) | 20 | 20 | 20 | 20 | 20 | 20 |
| Thermoplastic resin (C) | Type | PP1 | PP1 | PP1 | PE | PP2 | PP2 |
|  | (parts by mass) | 100 | 100 | 100 | 100 | 100 | 100 |
| Absolute evaluation |  |  |  |  |  |  |  |
| Interfacial shear strength | (MPa) | 29 | 30 | 30 | 26 | 19 | 28 |
| Flexural strength | (MPa) | 109 | 111 | 109 | 72 | 80 | 101 |
| Charpy unnotched impact strength | (kJ/m²) | 25 | 32 | 32 | 18 | 16 | 30 |
| Falling weight impact strength | (J) | 5 | 5 | 5 | 5 | 4 | 5 |
| Fuzz (strand) | (points) | 3 | 3 | 3 | 3 | 3 | 3 |
| Relative evaluation |  |  |  |  |  |  |  |
| Flexural strength | (%) | 218 | 222 | 218 | 133 | 154 | 194 |
| Charpy unnotched impact strength | (%) | 250 | 320 | 320 | 225 | 178 | 333 |
| Falling weight impact strength | (%) | 500 | 500 | 500 | 500 | 400 | 500 |
| Relative comparison standard |  | Comparative Example 38 | Comparative Example 38 | Comparative Example 38 | Comparative Example 53 | Comparative Example 51 | Comparative Example 51 |

TABLE 15

|  |  | Example 109 | Example 110 | Example 111 | Example 112 | Example 113 | Example 114 | Example 115 |
|---|---|---|---|---|---|---|---|---|
| Composition of sizing agent |  |  |  |  |  |  |  |  |
| Conjugated diene-based polymer (A) | Type | 17-B | 34-D | 17-B | 30-D | 17-B | 30-D | 17-B |
| Preparation method |  | A | A | A | A | A | A | A |
| Average particle size of conjugated diene-based polymer (A) | (micrometers) | 1.4 | 1.5 | 1.4 | 1.5 | 1.4 | 1.5 | 1.4 |
| Content of conjugated diene-based polymer (A) | (%) | 7 | 7 | 7 | 7 | 7 | 7 | 7 |
| Adhesion of conjugated diene-based polymer (A) | (mass %) | 1.8 | 1.5 | 1.8 | 1.9 | 1.8 | 1.9 | 1.8 |
| Conjugated diene-based polymer (A) | (parts by mass) | 0.4 | 0.3 | 0.4 | 1.1 | 0.4 | 1.1 | 0.4 |
| Fibers (B) | (parts by mass) | 20 | 20 | 20 | 60 | 20 | 60 | 20 |
| Thermoplastic resin (C) | Type | PP3b | PP3b | PA6 | PA6 | PA9T | PA9T | PPS |
|  | (parts by mass) | 100 | 100 | 100 | 100 | 100 | 100 | 100 |
| Absolute evaluation |  |  |  |  |  |  |  |  |
| Interfacial shear strength | (MPa) | 24 | 34 | 67 | 70 | 64 | 68 | 28 |
| Flexural strength | (MPa) | 88 | 121 | 155 | 199 | 150 | 193 | 160 |
| Charpy unnotched impact strength | (kJ/m²) | 20 | 30 | 33 | 37 | 32 | 36 | 30 |
| Falling weight impact strength | (J) | 4 | 6 | 7 | 9 | 7 | 9 | 6 |
| Fuzz (strand) | (points) | 3 | 3 | 3 | 3 | 3 | 3 | 3 |
| Relative evaluation |  |  |  |  |  |  |  |  |
| Flexural strength | (%) | 163 | 224 | 126 | 127 | 130 | 127 | 127 |
| Charpy unnotched impact strength | (%) | 250 | 375 | 174 | 161 | 152 | 171 | 167 |

TABLE 15-continued

|  |  |  |  |  |  |  |  |
|---|---|---|---|---|---|---|---|
| Falling weight impact strength | (%) | 400 | 600 | 350 | 180 | 233 | 180 | 300 |
| Relative comparison standard | | Comparative Example 52 | Comparative Example 52 | Comparative Example 39 | Comparative Example 54 | Comparative Example 40 | Comparative Example 55 | Comparative Example 41 |

|  |  | Example 116 | Example 117 | Example 118 | Example 119 | Example 120 | Example 121 | Example 122 |
|---|---|---|---|---|---|---|---|---|
| Composition of sizing agent | | | | | | | | |
| Conjugated diene-based polymer (A) | Type | 30-D | 40-A | 42-B | 30-D | 30-D | 30-D | 43-D |
| Preparation method | | A | A | A | E | F | G | A |
| Average particle size of conjugated diene-based polymer (A) | (micrometers) | 1.5 | 1.5 | 1.5 | — | — | 1.5 | 0.6 |
| Content of conjugated diene-based polymer (A) | (%) | 7 | 7 | 7 | 5 | 5 | 7 | 7 |
| Adhesion of conjugated diene-based polymer (A) | (mass %) | 1.9 | 2.0 | 2.1 | 4.7 | 4.5 | 1.9 | 1.2 |
| Conjugated diene-based polymer (A) | (parts by mass) | 1.1 | 0.4 | 0.4 | 0.9 | 0.9 | 0.4 | 0.2 |
| Fibers (B) | (parts by mass) | 60 | 20 | 20 | 20 | 20 | 20 | 20 |
| Thermoplastic resin (C) | Type | PPS | PP1 | PP1 | PP1 | PP1 | PP1 | PP1 |
|  | (parts by mass) | 100 | 100 | 100 | 100 | 100 | 100 | 100 |
| Absolute evaluation | | | | | | | | |
| Interfacial shear strength | (MPa) | 33 | 18 | 27 | 27 | 26 | 30 | 35 |
| Flexural strength | (MPa) | 192 | 74 | 100 | 108 | 105 | 113 | 125 |
| Charpy unnotched impact strength | (kJ/m$^2$) | 35 | 13 | 27 | 25 | 26 | 29 | 31 |
| Falling weight impact strength | (J) | 8 | 3 | 5 | 5 | 5 | 5 | 6 |
| Fuzz (strand) | (points) | 3 | 3 | 3 | 3 | 3 | 3 | 3 |
| Relative evaluation | | | | | | | | |
| Flexural strength | (%) | 122 | 148 | 200 | 216 | 210 | 226 | 250 |
| Charpy unnotched impact strength | (%) | 175 | 130 | 270 | 250 | 260 | 290 | 310 |
| Falling weight impact strength | (%) | 200 | 300 | 500 | 500 | 500 | 500 | 600 |
| Relative comparison standard | | Comparative Example 56 | Comparative Example 38 | Comparative Example 38 | Comparative Example 38 | Comparative Example 38 | Comparative Example 38 | Comparative Example 38 |

TABLE 16

|  |  | Comparative Example 38 | Comparative Example 39 | Comparative Example 40 | Comparative Example 41 | Comparative Example 42 | Comparative Example 43 | Comparative Example 44 |
|---|---|---|---|---|---|---|---|---|
| Composition of sizing agent | | | | | | | | |
| Conjugated diene-based polymer (A) | Type | — | — | — | — | 37-A | 38-B | 39-A |
| Preparation method | | — | — | — | — | A | A | A |
| Average particle size of conjugated diene-based polymer (A) | (micrometers) | — | — | — | — | 1.3 | 1.4 | 1.4 |
| Content of conjugated diene-based polymer (A) | (%) | — | — | — | — | 7 | 7 | 7 |
| Adhesion of conjugated diene-based polymer (A) | (mass %) | — | — | — | — | 2.0 | 1.8 | 1.9 |
| Conjugated diene-based polymer (A)/commercially-available sizing agent | (parts by mass) | — | — | — | — | 0.4 | 0.4 | 0.4 |
| Fibers (B) | (parts by mass) | 20 | 20 | 20 | 20 | 20 | 20 | 20 |
| Thermoplastic resin (C) | Type | PP1 | PA6 | PA9T | PPS | PP1 | PP1 | PP1 |
|  | (parts by mass) | 100 | 100 | 100 | 100 | 100 | 100 | 100 |
| Absolute evaluation | | | | | | | | |
| Interfacial shear strength | (MPa) | 7 | 58 | 53 | 20 | 11 | 13 | 15 |
| Flexural strength | (MPa) | 50 | 123 | 115 | 126 | 55 | 57 | 60 |
| Charpy unnotched impact strength | (kJ/m$^2$) | 10 | 19 | 21 | 18 | 5 | 5 | 7 |
| Falling weight impact strength | (J) | 1 | 2 | 3 | 2 | 1 | 1 | 1 |
| Fuzz (strand) | (points) | 1 | 1 | 1 | 1 | 1 | 1 | 1 |
| Relative evaluation | | | | | | | | |
| Flexural strength | (%) | 100 | 100 | 100 | 100 | 110 | 114 | 120 |
| Charpy unnotched impact strength | (%) | 100 | 100 | 100 | 100 | 50 | 50 | 70 |
| Falling weight impact strength | (%) | 100 | 100 | 100 | 100 | 100 | 100 | 100 |
| Relative comparison standard | | Comparative Example 38 | Comparative Example 39 | Comparative Example 40 | Comparative Example 41 | Comparative Example 38 | Comparative Example 38 | Comparative Example 38 |

TABLE 16-continued

|  |  | Comparative Example 45 | Comparative Example 46 | Comparative Example 47 | Comparative Example 48 | Comparative Example 49 | Comparative Example 50 |
|---|---|---|---|---|---|---|---|
| Composition of sizing agent |  |  |  |  |  |  |  |
| Conjugated diene-based polymer (A) | Type | 36-B | D1 | D2 | D3 | D4 | D5 |
| Preparation method |  | A | H | H | H | H | H |
| Average particle size of conjugated diene-based polymer (A) | (micrometers) | 1.3 | 1.8 | 1.7 | 1.6 | 1.7 | 1.5 |
| Content of conjugated diene-based polymer (A) | (%) | 7 | 20 | 20 | 20 | 20 | 20 |
| Adhesion of conjugated diene-based polymer (A) | (mass %) | 1.9 | 2.0 | 2.2 | 1.8 | 1.3 | 1.8 |
| Conjugated diene-based polymer (A)/ commercially-available sizing agent | (parts by mass) | 0.4 | 0.4 | 0.4 | 0.4 | 0.3 | 0.4 |
| Fibers (B) | (parts by mass) | 20 | 20 | 20 | 20 | 20 | 20 |
| Thermoplastic resin (C) | Type | PP1 | PP1 | PP1 | PP1 | PP1 | PP1 |
|  | (parts by mass) | 100 | 100 | 100 | 100 | 100 | 100 |
| Absolute evaluation |  |  |  |  |  |  |  |
| Interfacial shear strength | (MPa) | 15 | 16 | 15 | 16 | 16 | 16 |
| Flexural strength | (MPa) | 63 | 70 | 68 | 68 | 65 | 64 |
| Charpy unnotched impact strength | (kJ/m$^2$) | 7 | 10 | 9 | 10 | 9 | 10 |
| Falling weight impact strength | (J) | 1 | 1 | 1 | 1 | 1 | 1 |
| Fuzz (strand) | (points) | 1 | 1 | 1 | 1 | 1 | 1 |
| Relative evaluation |  |  |  |  |  |  |  |
| Flexural strength | (%) | 126 | 140 | 136 | 136 | 130 | 128 |
| Charpy unnotched impact strength | (%) | 70 | 100 | 90 | 100 | 90 | 100 |
| Falling weight impact strength | (%) | 100 | 100 | 100 | 100 | 100 | 100 |
| Relative comparison standard |  | Comparative Example 38 | Comparative Example 38 | Comparative Example 38 | Comparative Example 38 | Comparative Example 38 | Comparative Example 38 |

TABLE 17

|  |  | Comparative Example 51 | Comparative Example 52 | Comparative Example 53 | Comparative Example 54 | Comparative Example 55 | Comparative Example 56 |
|---|---|---|---|---|---|---|---|
| Composition of sizing agent |  |  |  |  |  |  |  |
| Conjugated diene-based polymer (A) | Type | — | — | — | — | — | — |
| Preparation method |  | — | — | — | — | — | — |
| Average particle size of conjugated diene-based polymer (A) | (micrometers) | — | — | — | — | — | — |
| Content of conjugated diene-based polymer (A) | (%) | — | — | — | — | — | — |
| Adhesion of conjugated diene-based polymer (A) | (mass %) | — | — | — | — | — | — |
| Conjugated diene-based polymer (A)/ commercially-available sizing agent | (parts by mass) | — | — | — | — | — | — |
| Fibers (B) | (parts by mass) | 20 | 20 | 20 | 60 | 60 | 60 |
| Thermoplastic resin (C) | Type | PP2 | PP3b | PE | PA6 | PA9T | PPS |
|  | (parts by mass) | 100 | 100 | 100 | 100 | 100 | 100 |
| Absolute evaluation |  |  |  |  |  |  |  |
| Interfacial shear strength | (MPa) | 7 | 8 | 7 | 58 | 53 | 20 |
| Flexural strength | (MPa) | 52 | 54 | 35 | 157 | 152 | 157 |
| Charpy unnotched impact strength | (kJ/m$^2$) | 9 | 8 | 5 | 23 | 21 | 20 |
| Falling weight impact strength | (J) | 1 | 1 | 1 | 5 | 5 | 4 |
| Fuzz (strand) | (points) | 1 | 1 | 1 | 1 | 1 | 1 |
| Relative evaluation |  |  |  |  |  |  |  |
| Flexural strength | (%) | 100 | 100 | 100 | 100 | 100 | 100 |
| Charpy unnotched impact strength | (%) | 100 | 100 | 100 | 100 | 100 | 100 |
| Falling weight impact strength | (%) | 100 | 100 | 100 | 100 | 100 | 100 |
| Relative comparison standard |  | Comparative Example 51 | Comparative Example 52 | Comparative Example 53 | Comparative Example 54 | Comparative Example 55 | Comparative Example 56 |

The details of the sizing agent, the fibers, and the thermoplastic resin (other than those described above) listed in Tables 12 to 17 are as follows.

<Sizing Agent>

D1: Acid-modified polypropylene "UMEX 1001" (trade name) manufactured by Sanyo Chemical Industries, Ltd.

D2: Acid-modified polypropylene "UMEX 1010" (trade name) manufactured by Sanyo Chemical Industries, Ltd.

D3: Acid-modified polypropylene "TOYO-TAC PMA-1000P" (trade name) manufactured by Toyobo Co., Ltd.

D4: Phosphorus-based flame retardant "FIRETARD E-06" (trade name) manufactured by Sanyo Chemical Industries, Ltd.

D5: Epoxy resin "JER1004" (trade name) manufactured by Mitsubishi Chemical Corporation <Fibers (B)>

"TORAYCA T700SC-12000-50C" (trade name) manufactured by Toray Industries Inc. (from which the sizing agent had been removed using acetone)

3.9. Evaluation Results

According to Comparative Examples 38 to 41 and 51 to 56 in which the conjugated diene-based polymer (A) was not used, the interfacial shear strength, the flexural strength, the Charpy unnotched impact strength, and the falling weight impact strength were inferior to those obtained when the conjugated diene-based polymer (A) was used.

According to Comparative Examples 42 to 45 in which the conjugated diene-based polymer that did not include a specific functional group was used, the interfacial shear strength, the flexural strength, the Charpy unnotched impact strength, and the falling weight impact strength were inferior to those obtained when the conjugated diene-based polymer (A) that included a specific functional group was used.

According to Comparative Examples 46 to 50 in which a polymer other than the conjugated diene-based polymer (A) was used as the sizing agent, the interfacial shear strength, the flexural strength, the Charpy unnotched impact strength, and the falling weight impact strength deteriorated.

The invention is not limited to the embodiments described above. Various modifications and variations may be made of the embodiments described above. The invention includes various other configurations that are substantially the same as the configurations described above in connection with the embodiments (such as a configuration having the same function, method, and results, or a configuration having the same objective and results). The invention also includes configurations in which an unsubstantial element or the like described above in connection with the embodiments is replaced by another element or the like. The invention also includes a configuration having the same effects as those of the configurations described above in connection with the embodiments, or a configuration that is capable of achieving the same objective as that of the configurations described above in connection with the embodiments. The invention further includes a configuration in which a known technique is added to the configurations described above in connection with the embodiments.

The invention claimed is:

1. A composition comprising a conjugated diene-based polymer (A), fibers (B), and a thermoplastic resin (C),
    the composition comprising the conjugated diene-based polymer (A) in an amount of 0.05 to 30 parts by mass based on 100 parts by mass of the thermoplastic resin (C), and comprising the fibers (B) in an amount of 3 to 150 parts by mass based on 100 parts by mass of the thermoplastic resin (C),
    wherein the conjugated diene-based polymer (A) comprises the alkoxysilyl group and the amino group.

2. The composition according to claim 1,
    wherein the fibers (B) are at least one type of fibers selected from the group consisting of carbon fibers, glass fibers, and cellulose fibers.

3. The composition according to claim 1,
    wherein the thermoplastic resin (C) is at least one thermoplastic resin selected from the group consisting of a polyamide, an olefin-based resin, and polyphenylene sulfide.

4. The composition according to claim 1,
    wherein the conjugated diene-based polymer (A) comprises two or more polymer blocks selected from polymer blocks A to D,
    the polymer block A being a polymer block that comprises a repeating unit derived from an aromatic alkenyl compound in an amount of 80 mass % or more,
    the polymer block B being a polymer block that comprises a repeating unit derived from a conjugated diene in an amount of 80 mass % or more, and has a vinyl bond content of less than 30 mol %,
    the polymer block C being a polymer block that comprises a repeating unit derived from a conjugated diene in an amount of 80 mass % or more, and has a vinyl bond content of 30 to 90 mol %, and
    the polymer block D being a random copolymer block that comprises a repeating unit derived from a conjugated diene and a repeating unit derived from an aromatic alkenyl compound, and excludes the polymer blocks A to C.

5. The composition according to claim 1,
    wherein the conjugated diene-based polymer (A) has been hydrogenated.

6. A formed article obtained by forming the composition according to claim 1.

* * * * *